United States Patent
Jäckel

[11] Patent Number: 5,863,274
[45] Date of Patent: Jan. 26, 1999

[54] APPARATUS FOR DAMPING FLUCTUATIONS OF TORQUE

[75] Inventor: Johann Jäckel, Baden-Baden, Germany

[73] Assignee: Luk Lamellen und Kupplungsbau GmbH, Buhl, Germany

[21] Appl. No.: 785,333

[22] Filed: Jan. 16, 1997

[30] Foreign Application Priority Data

Jan. 18, 1996 [DE] Germany ............ 196 01 620.7

[51] Int. Cl.$^6$ ............... F16D 3/80; F16F 15/22
[52] U.S. Cl. ............ 475/347; 475/346; 192/70.17; 74/574
[58] Field of Search ............... 74/574; 475/346, 475/347; 192/70.17, 55.4, 55.6, 208

[56] References Cited

U.S. PATENT DOCUMENTS

| | | | |
|---|---|---|---|
| 3,960,036 | 6/1976 | Moller | 475/347 X |
| 4,436,193 | 3/1984 | Smirl | 192/113.36 X |
| 4,573,374 | 3/1986 | Koshimo et al. | 74/574 |
| 4,676,121 | 6/1987 | Kouno | 74/574 |
| 4,946,420 | 8/1990 | Jäckel . | |
| 5,080,642 | 1/1992 | Takami | 475/347 X |
| 5,125,872 | 6/1992 | Reik | 74/574 X |
| 5,496,224 | 3/1996 | Rohs et al. | 74/574 X |
| 5,551,928 | 9/1996 | Sudau | 475/347 |
| 5,634,866 | 6/1997 | Sudau | 475/347 |
| 5,716,300 | 2/1998 | Sammataro et al. | 475/346 |

*Primary Examiner*—Dirk Wright
*Assistant Examiner*—Peter T. Kwon
*Attorney, Agent, or Firm*—Darby & Darby

[57] ABSTRACT

A composite flywheel wherein a primary mass is rotatable by the engine of a motor vehicle and can transmit torque to a secondary mass—which serves to rotate the clutch plate of a friction clutch—by way of several sets of coil springs and a planetary transmission. A friction clutch serves to oppose certain angular movements of the primary and secondary masses relative to each other, and a slip clutch is provided to limit the magnitude of the torque which can be transmitted by the planetary transmission.

78 Claims, 13 Drawing Sheets

APPARATUS FOR DAMPING FLUCTUATIONS OF TORQUE

BACKGROUND OF THE INVENTION

The invention relates to apparatus for damping the fluctuations (such as vibrations and/or peaks) of torque which is being transmitted between a plurality of rotary masses, for example, in a composite flywheel wherein a first or primary mass or flywheel is rotatable with as well as relative to a second or secondary mass or flywheel, or vice versa.

More particularly, the invention relates to improvements in apparatus which can be utilized with advantage to oppose undesirable stray movements (such as vibratory movements, abrupt accelerations or abrupt decelerations) of one or more parts which receive torque from a crankshaft, a camshaft or another rotary output element of a prime mover (such as the combustion engine of a motor vehicle) and which serve to transmit torque to an input element (such as the pressure plate or the clutch disc of a friction clutch) which, in turn, transmits torque to one or more rotary input elements of one or more driven assemblies (e.g., a manual, automated or automatic change-speed transmission, a differential, a light generator, an air conditioning system, a constituent of a power steering mechanism and/or others).

It is well known to provide the power train of a motor vehicle with a vibration damping system which is called a composite flywheel and employs two coaxial masses or flywheels (including a primary mass which is attached to the output element of the engine and a secondary mass which can transmit torque to a transmission, e.g., by way of a suitable clutch) which are rotatable with each other as well as relative to each other against the resistance of a damping device or other suitable means for yieldably opposing rotation of the primary and secondary masses relative to each other.

It is also known to employ a damping mechanism which includes a planetary transmission (hereinafter called planetary for short) and energy storing means acting in the circumferential direction of the primary and secondary masses. An advantage of a planetary between the primary and secondary masses of a torsional vibration damping apparatus (as used herein, the term "torsional vibration" is intended to embrace all undesirable stray movements which should not be transmitted from the primary to the secondary mass of a composite flywheel or an analogous vibration damping apparatus or system, e.g., in the power train between the engine and the wheels of a motor vehicle, such as might be caused for example by inertia, inaccurate centering and/or for other reasons) is that the planetary can eliminate or weaken the influence of fluctuations of torque resulting from the inertia of rotating masses and/or from the damping of transmitted torque. Otherwise stated, the planetary can exert a beneficial influence upon the behavior of a torsional vibration damping apparatus as a result of appropriate selection of the transmission ratio.

For example, a presently known torsional vibration damping apparatus which is to be effective between two masses or flywheels adapted to rotate about a common axis with as well as relative to each other is designed to enhance the comfort of the occupant(s) of a motor vehicle in that its energy storing means (e.g., a coil spring or a set of coil springs) is designed in such a way that its spring rate or stiffness is reduced at least within the first stage or portion of its characteristic curve. This can be readily achieved if the energy storing means employs a series of coil springs. Furthermore, such energy storing means can be utilized in conjunction with two masses which are rotatable relative to each other and which can effect a change of the moment of inertia as a function of movement; this can result in a reduction (or even elimination) of peaks (if any) of transmitted torque. Thus, it is possible to equip the power train of a motor vehicle with a composite flywheel which is specifically designed and particularly well suited for use in a specific make of a motor vehicle.

The kinematics of a planetary which operates between the primary and secondary masses of a composite flywheel can be selected to exert a beneficial influence upon the composite flywheel as well as upon the entire power train within a wide range of the magnitudes of transmitted torque. For example, if the planetary is designed in such a way that its input side is being acted upon by mutually opposing damping forces in the free mass, it is possible to reduce the peaks of torque acting upon the output element (such as a camshaft or a crankshaft) of an engine. Furthermore, the planetary can reduce undesirable accelerations of RPM at the output side, i.e., at the side which is remote from the prime mover and serves to transmit torque to a transmission, e.g., by way of a friction clutch or any other suitable clutch. This, in turn, prolongs the useful life of various auxiliary aggregates (such as the aforementioned light generator (dynamo), the air conditioning system, the pump of the power steering mechanism and others) which receive motion from the output element of the engine downstream of the flywheel.

To summarize, available torsional vibration damping apparatus of the above outlined character can take advantage of three important expedients or principles, namely friction, velocity-related damping, and acceleration related damping.

In certain presently known torsional vibration damping apparatus, the primary mass is rotatable relative to at least one carrier forming part of a planetary and mounting at least one planet pinion which meshes with a sun gear or sun wheel and an internal gear or wheel. One of the primary and secondary masses of such apparatus is provided with an abutment which acts upon the energy storing means of the apparatus between the primary and secondary masses whereby the energy storing means bears upon an intermediate mass (e.g., a mass including the sun gear, the planet carrier(s) and the internal gear). The parameters of movement of the intermediate mass vary as a function of variations of the extent and direction of angular displacements of the primary and secondary masses relative to each other.

FIGS. 3 and 4 of German patent No. 31 39 658 C2 illustrate a torsional vibration damping apparatus wherein the primary mass is provided with a friction lining and is fixedly secured to a sun gear on a hub of a secondary mass. The planetary which includes the sun gear further comprises a planet carrier which is secured to the hub and has limited freedom of movement relative to the friction lining. The planet pinions which are mounted on the carrier mesh with the sun gear as well as with an internal gear on one or more covering panels for the hub. The internal gear can turn relative to the hub. The panels have windows for discrete springs of the energy storing means.

In the just described conventional torsional vibration damping apparatus, torque which is being transmitted to the primary mass is transmitted to the sun gear by way of the friction lining. In the event of fluctuations of transmitted torque, the planet pinions rotate relative to the sun gear and relative to the internal gear to thus effect a change in the angular position of the aforementioned panels relative to the hub. This entails a stressing of the springs, i.e., the energy storing means is caused to store energy.

By properly selecting the ratio of the planetary, the extent of deformation of the springs in the windows of the panels can be selected in such a way that it is more satisfactory than in a torsional vibration damping apparatus which does not employ a planetary, i.e., wherein the springs of the energy storing means are stressed to an extent which is directly proportional to the extent of angular movement of the primary and secondary masses relative to each other. It has been found that the stressing of springs, which form part of the energy storing means, by way of a planetary is much more effective to reduce or to eliminate the influence of undesirable fluctuations of transmitted torque. However, the just described torsional vibration damping apparatus also exhibit a serious drawback, namely the mass moment of inertia at the output side is small which affects the ability of the patented apparatus to counteract or absorb pronounced fluctuations of transmitted torque.

A torsional vibration damping apparatus which can counteract more pronounced fluctuations of torque and is installed between the primary and secondary masses of such apparatus (e.g., a twin-mass flywheel) is disclosed, for example, in German patent No. 36 30 398 C2. This rather rudimentary apparatus merely employs a set of springs which are stressed to a greater or lesser extent, depending upon the magnitude of the angle of rotation of the primary and secondary masses relative to each other. A drawback of such apparatus is that their ability to absorb or counteract fluctuations of torque is rather limited though they are capable of absorbing some of the fluctuations regardless of their magnitude.

A comparison of torsional vibration damping apparatus which merely employ a set of springs with those which employ energy storing means in conjunction with planetaries indicates that those using planetaries exhibit at least some important advantages including the following:

If the primary mass receives torque so that it begins to rotate relative to the secondary mass (or vice versa), the primary mass transmits a first portion of the torque to the secondary mass whereas the remaining second portion of such torque is transmitted to the aforementioned intermediate mass (which can include the sun gear, the planet carrier and the internal gear of the planetary). The ratio of the first and second portions of the torque being transmitted by the primary mass (as concerns the magnitudes and the directions of action of the first and second portions of the torque) is dependent upon the construction of the planetary and the manner in which the planetary is operatively connected with the primary and/or with the secondary mass. It is possible to design and install the planetary in such a way that the magnitude of the first and/or the second portion of the engine torque being transmitted by an apparatus employing a planetary exceeds the torque being transmitted to the primary mass. However, by mounting the springs of the energy storing means in two sets one of which damps the fluctuations (if any) of the first portion of transmitted torque and the other of which damps the fluctuations of the second portion of transmitted torque, it is possible to ensure that the torque being transmitted by the secondary mass a least approximates the torque being transmitted to the primary mass. The two sets of springs of the energy storing means do not undergo any pronounced deformation but can effect a desirable "smoothing" of the respective portions of the torque being transmitted by the primary mass, i.e., the fluctuations of the torque being transmitted by the secondary mass are or can be much less pronounced than those of the torque being transmitted to and by the primary mass. Moreover, the inertia of the secondary and intermediate masses does not greatly affect the quality of the damping action provided that the magnitudes of the first and second portions of the torque being transmitted by the primary mass are substantial. On the other hand, if the magnitudes of the two portions of the torque being transmitted from the primary mass (a) directly to the secondary mass and (b) to the intermediate mass are relatively small, the difference between the RPM of the secondary mass and the RPM of the intermediate mass is very pronounced with the result that the springs undergo a substantial deformation and the inertia of the secondary and intermediate masses appears to be much greater.

The above enumerated experiences with conventional torsional vibration damping apparatus employing a planetary would indicate that the planetary and its connection with at least one of the primary and secondary masses should be selected with a view to ensure a pronounced damping of the fluctuations of transmitted torque prior to the transmission of the thus influenced torque to the part or parts being driven by the secondary mass. This holds true irrespective of which of the masses (other than the intermediate mass) acts as a primary mass or a secondary mass. It is to be borne in mind that the ratio of a planetary changes when a vehicle is coasting, i.e., if the normally secondary mass serves to transmit torque to the normally primary mass because, in lieu of transmitting motion from the sun gear, to the internal gear the planet pinions then transmit motion from the internal gear to the sun gear (or the other way around).

OBJECTS OF THE INVENTION

An object of the invention is to provide a torsional vibration damping apparatus which is simpler, longer-lasting and more reliable than heretofore known apparatus.

Another object of the invention is to provide a novel and improved combination of a planetary with the primary and secondary masses of a composite flywheel.

A further object of the invention is to provide a novel and improved combination of a planetary and energy storing means in a composite flywheel.

An additional object of the invention is to provide a novel and improved combination of a planetary, of energy storing means and the primary mass of a composite flywheel.

Still another object of the invention is to provide a novel and improved combination of a planetary, energy storing means and the secondary mass of a composite flywheel.

A further object of the invention is to provide a novel and improved composite flywheel which is suited for use in the power trains of motor vehicles as a superior substitute for conventional composite flywheels with or without planetaries.

Another object of the invention is to provide a torsional vibration damping apparatus which can exert a beneficial influence upon the engine of a motor vehicle.

An additional object of the invention is to provide a novel and improved power train for use in a motor vehicle between the engine and the wheels.

Still another object of the invention is to provide a novel and improved method of reducing or eliminating undesirable fluctuations of torque which is being transmitted to the primary mass of a composite flywheel wherein the connection between the primary and secondary masses comprises energy storing means and a planetary.

SUMMARY OF THE INVENTION

One feature of the invention resides in the provision of a torsional vibration damping apparatus which comprises first and second masses rotatable with and relative to each other about a common axis, means for transmitting torque between the first and second masses including energy storing means acting in a circumferential direction of the first and second masses and a planetary, and means for limiting the magnitude of the torque which is transmittable between the first and second masses. The apparatus can further comprise means for connecting one of the first and second masses to a rotary component of a prime mover (e.g., to the crankshaft or camshaft of a combustion engine), and means for connecting the other of the first and second masses with a rotary component of a driven arrangement, e.g., with a rotary component of a manual, automated or automatic change-speed transmission in a motor vehicle.

Another feature of the invention resides in the provision of a torsional vibration damping apparatus which comprises a rotary torque transmitting first component, a torque receiving second component which is rotatable with and relative to the first component about a common axis, means for transmitting torque between the first and second components, and means for limiting the magnitude of torque which is transmittable from one of the first and second components to the other of the first and second components (and more specifically between a (first) mass or flywheel forming part of the first component and a (second) mass or flywheel forming part of the second component).

The means for transmitting torque between the first and second components comprises (a) energy storing means and (b) a planetary including at least one planet carrier which is rotatable about the common axis relative to the first component, at least one planet pinion rotatably mounted on the at least one carrier, an internal gear which is coaxial with the at least one carrier and meshes with the at least one pinion, and a sun gear which meshes with the at least one pinion. One of the first and second components is provided with means for stressing the energy storing means in response to rotation of the components relative to each other. The aforementioned first and second masses are rotatable at a plurality of speeds and relative to each other in clockwise and counterclockwise directions, and the energy storing means is installed in at least one of the first and second components to react against at least one of the first and second masses and to bear against at least one intermediate mass forming part of the planetary and being rotatable about the common axis at a velocity which is dependent upon the aforementioned speed and upon the direction of rotation of at least one of the first and second masses relative to the other of the first and second masses. The intermediate mass can include the sun gear, the at least one planet carrier and/or the internal gear of the planetary.

The at least one pinion of the planetary can be installed and utilized in such a way that it is operative to establish a connection between one of the first and second masses on the one hand and the other two masses on the other hand. The energy storing means of such apparatus can be arranged to couple one of the first and second masses with the at least one intermediate mass.

Alternatively, the energy storing means can operate between the first and second masses and the at least one pinion then couples the at least one intermediate mass with at least one of the first and second masses.

Still further, the at least one pinion can couple one of the first and second masses with the at least one intermediate mass and the energy storing means then operates between the first and second masses.

The internal gear can form part of one of the first and second masses, and the at least one intermediate mass can include the at least one planet carrier.

Alternatively, one of the first and second masses can include the at least one carrier and the at least one intermediate mass then includes the internal gear.

One of the first and second masses can define a recess for a portion at least of the planetary. Such portion of the planetary can include the internal gear and the at least one planet carrier. The recess can include an at least partially closed chamber for a supply of grease, oil or other suitable viscous (such as highly viscous) material. Such apparatus can further include means for at least partially sealing the chamber against the escape of viscous material. The planetary can comprise a plurality of pinions which are spaced apart from each other in the circumferential direction of the first and second components, and the at least one carrier can include portions which are spaced apart from each other in the direction of the common axis; the pinions and the internal gear can be disposed between the spaced-apart portions of the at least one carrier. Such spaced-apart portions of the at least one carrier can form part of the aforementioned sealing means for the chamber. The at least one carrier can include a first part which is remote from and a second part which is nearer to the common axis, the first part can be confined in one of the first and second masses, and the aforementioned spaced-apart portions of the at least one carrier can be closely adjacent that one of the first and second masses which confines the second part of the at least one carrier. That one of the first and second masses which defines the recess can include a ring which surrounds the chamber, and the sealing means can include a substantially plate-like portion of such ring. The sealing means can further comprise a substantially plate-like wall which extends from the ring substantially radially inwardly toward the common axis between the chamber and the other of the first and second masses.

One of the first and second masses has a side which confronts the other of the first and second masses, and the apparatus can further comprise means for locating such other mass against axial movement relative to the one mass. The locating means can be borne by one of the first and second masses and can comprise at least one friction ring located at a predetermined radial distance from the common axis.

The planetary has a first portion which is more distant from and a second portion which is nearer to the common axis and is provided with at least one projection. Such apparatus can further comprise a friction generating device which is provided on one of the first and second masses and has at least one socket receiving the at least one projection with a predetermined play in a circumferential direction of the first and second components. The at least one carrier can form part of the second portion of the planetary.

The apparatus can comprise a friction generating device which is disposed between one of the first and second masses and a portion of the planetary, as seen in the direction of the common axis. Such friction generating device can comprise a diaphragm spring and a friction disc which is engaged by the diaphragm spring. The portion of the planetary can include the sun gear.

At least a portion of the energy storing means can be confined in a chamber provided in one of the first and second masses, and this one of the first and second masses can be provided with at least one abutment for the energy storing means. The latter can react against such at least one abutment to bear against the at least one carrier of the planetary. The aforementioned recess for a portion at least of the planetary is adjacent the chamber for the energy storing means, and such recess is also adjacent the other of the first and second masses. The chamber can extend in the direction of the common axis as well as in a circumferential direction of the two components, and the chamber can further receive a portion of the planetary; such portion of the planetary can include the internal gear and the at least one pinion. One of the first and second masses can be provided with a wall which extends substantially radially of the common axis and cooperates with a portion of the planetary to at least substantially seal the chamber; such portion of the planetary can include the at least one pinion. The at least one carrier of the planetary can be mounted on that one of the first and second masses which is provided with the chamber, and the apparatus can further comprise a bearing for the other of the first and second masses; such bearing can be provided on the at least one carrier.

The at least one carrier of the planetary can rotatably mount one of the first and second masses.

It is preferred to install a bearing between at least two of the first, second and intermediate masses in order to maintain such two masses in predetermined positions relative to each other (as seen radially of the common axis). The at least one planet carrier can form part of the intermediate mass, and one of the first and second masses can include a hub which is coaxial with the other of the first and second masses; the bearing can be disposed between the at least one carrier and the hub. The arrangement can be such that the bearing is disposed between a hub which is carried by the first mass and a support which is provided on the second mass.

The bearing can constitute an antifriction bearing which includes at least one annulus of spherical or other suitable rolling elements, a first race which surrounds a hub of one of the at least two masses, and a second race which is surrounded by the other of the at least two masses. The at least two masses can be provided with means for holding the bearing against movement in the direction of the common axis relative to the hub and relative to the other of the at least two masses. A thermal insulator can be installed between one of the first and second races of the bearing and the respective one of the at least two masses. Such insulator can have a substantially L-shaped cross-sectional outline.

Alternatively, the bearing can constitute a friction bearing. Such friction bearing can be provided between a hub of the first mass and a support forming part of or provided on the second mass and extending substantially radially of the common axis.

Regardless of whether the bearing is a friction bearing or an antifriction bearing, it can be provided between a hub of the first mass and a radially inner portion of the second mass. The hub can include a larger-diameter portion more distant from the radially inner portion of the second mass and a smaller-diameter portion which is surrounded by the bearing and by the radially inner portion of the second mass. Such bearing is or can be narrow as seen radially of the common axis, i.e., the smaller-diameter portion of the hub can be closely adjacent the radially inner portion of the second mass (as seen in a direction radially of the common axis).

The sun gear of the planetary can surround and can be centered by the bearing.

The energy storing means can comprise one or more coil springs, for example, one or more arcuate coil springs. If the number of the coil springs is small, each such coil spring can have a length which is a multiple (e.g., a large multiple) of the diameters of its convolutions. If the energy storing means comprises a relatively large number of coil springs, the diameter of a convolution of each such relatively short coil spring can be a substantial fraction (e.g., one half or even more) of the axial length of the spring. For example, the energy storing means can comprise a plurality of coil springs which are disposed end-to-end, which operate in series, and which extend in the circumferential direction of the first and second components.

The planetary can be disposed at a first radial distance from the common axis, and the energy storing means can be disposed at a greater second radial distance from such axis.

The energy storing means tends to move radially of and away from the common axis under the action of centrifugal force in response to rotation of the first and second components, and the apparatus can further comprise at least one wear-resistant member (e.g., an arcuate trough or shroud) which is provided in at least one of the components in the path of radially outward movement of the energy storing means.

The planetary can be designed in such a way that it comprises a plurality of stages or ratios. For example, the at least one pinion can include a first portion which meshes with the internal gear, and a different second portion which is coaxial with the first portion and meshes with the sun gear.

If the first component is arranged to receive torque from a prime mover which is designed to transmit a predetermined maximum torque, the torque limiting means of the improved apparatus can be operative to permit the transmission of a torque which at least matches the predetermined maximum torque.

The at least one carrier of the planetary can form part of the torque limiting means. Furthermore, the at least one carrier of the planetary can be connected with the torque limiting means. The latter can be arranged to rotate with the at least one carrier.

The torque limiting means can be installed to frictionally engage one of the first and second masses, particularly the first mass.

If one of the first and second masses has a chamber for a portion of or for the entire energy storing means, and if one of the first and second masses carries or includes a wall which bounds a portion of such chamber, the torque limiting means can be constructed, assembled and installed to cooperate with such wall. For example, the wall can be of one piece with the respective mass, and such mass could be constituted by the first mass.

The torque limiting means can comprise at least one friction lining and/or at least one resilient element which is stressed in the direction of the common axis. Such resilient element can comprise or constitute a diaphragm spring. The resilient element of the torque limiting means can bear upon a wall bounding a portion of the aforementioned chamber which contains a supply of viscous material.

The apparatus can comprise a first friction generating device which forms part of or constitutes the torque limiting means, and at least one additional friction generating device which operates between two of the first, second and intermediate masses. The torque limiting means can be disposed at a greater first and the at least one additional friction generating device can be disposed at a lesser second radial distance from the common axis.

For example, the improved apparatus can comprise a friction generating device which operates between the first and second components to oppose rotation of such components relative to each other, at least after the two components complete a predetermined angular movement relative to each other. A form-locking connection can be provided between such friction generating device and one of the first and second masses, particularly between the friction generating device and the second mass. Such form-locking connection can be designed to establish a predetermined extent of movability between the friction generating device and one of the first and second masses.

The improved apparatus can also comprise means for shielding the planetary against overstressing. Such shielding means can comprise at least one stop which operates in parallel with the planetary. The shielding means can consist of or contain a resilient material, e.g., an elastomeric material.

The novel features which are considered as characteristic of the invention are set forth in particular in the appended claims. The improved torsional vibration damping apparatus itself, however, both as to its construction, its mode of operation and the mode of assembling and installing the same, together with numerous additional important features and advantages thereof, will be best understood upon perusal of the following detailed description of certain presently preferred specific embodiments with reference to the accompanying drawings.

DESCRIPTION OF PREFERRED EMBODIMENTS

Figure 1:
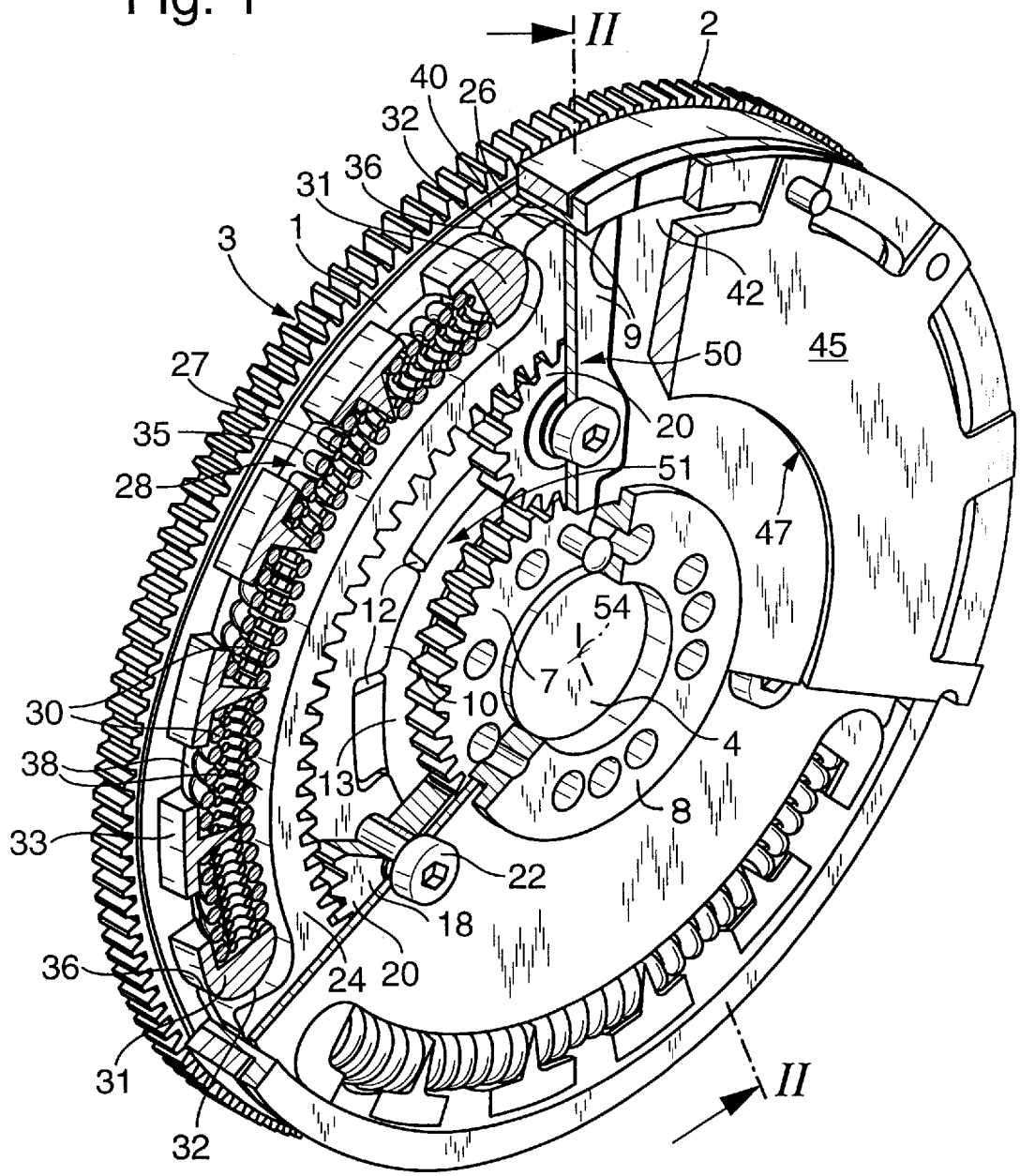
FIG. 1 is a perspective view, with portions of certain parts broken away, of a torsional vibration damping apparatus in the form of a composite flywheel which embodies one form of the present invention.
Figure 2:
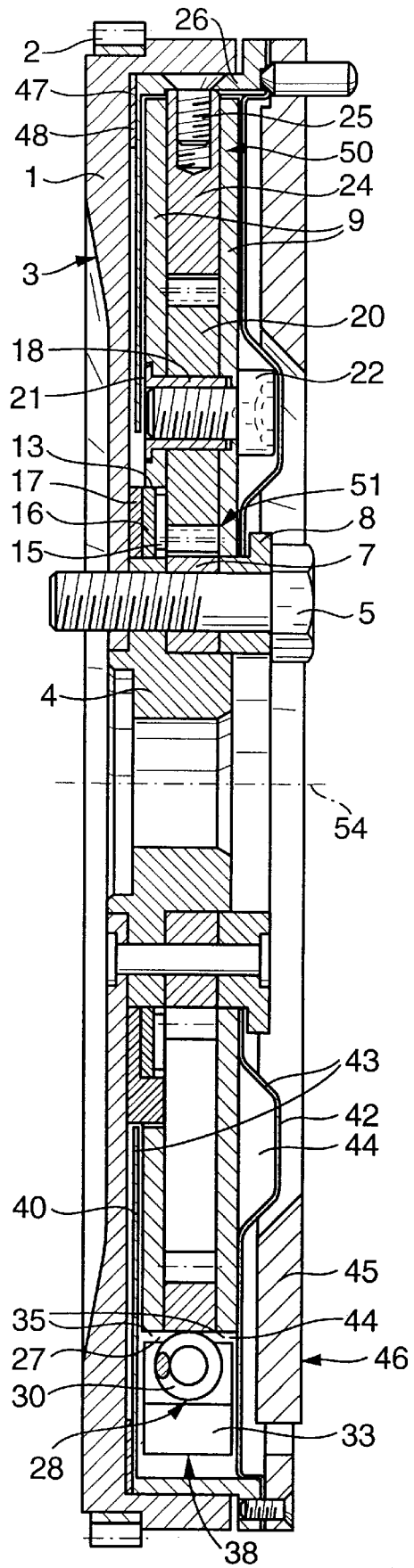
FIG. 2 is an enlarged sectional view substantially as seen in the direction of arrows from the line II—II in FIG. 1.

FIGS. 1 and 2 illustrate a torsional vibration damping apparatus which constitutes a composite flywheel having a rotary torque transmitting first component 3 and a rotary torque receiving second component 46 which is rotatable with as well as relative to the component 3 about a common axis 54. The component 3 includes a first flywheel or mass 1 (hereinafter called mass, first mass or primary mass), and the component 46 includes a second flywheel or mass 45 (hereinafter called mass, second mass or secondary mass). The mass 1 carries or is of one piece with a starter gear 2 which meshes with a starter pinion (not shown in FIGS. 1 and 2).

The radially inner portion of the primary mass 1 is affixed to a hub 4 by a set of threaded fasteners 5. These fasteners further serve to secure the hub 4 to the rotary output element (such as a camshaft or a crankshaft) of a combustion engine in a passenger car, a truck or another motor vehicle, as well as to connect the hub with a sun gear or sun wheel 7 of a planetary and also with a flange 8. The planetary further comprises a two-piece planet carrier 9 the disc-shaped parts or portions of which are disposed at the opposite sides of the sun gear 7 (as seen in the direction of the axis 54); this carrier 9 constitutes an intermediate mass 50 which is flanked by the masses 1 and 45 (again as seen in the direction of the axis 54). FIG. 2 shows that the right-hand portion of the planet carrier 9 (i.e., of the intermediate mass 50) extends radially inwardly all the way to the smaller-diameter portion of the external surface of the flange 8. The left-hand portion of the carrier 9 (as viewed in FIG. 2) has a radially inner or innermost part which carries a set of projections 10 extending with play (as seen in the circumferential direction of the components 3 and 46) into the recesses 12 of a friction generating device 13. The device 13 is located between the primary mass 1 and the sun gear 7, as seen in the direction of the axis 54, and comprises at least one diaphragm spring 15, an intermediate ring 16 and a friction disc 17. The diaphragm spring 15 is stressed in the direction of the axis 54; it reacts against the planetary and bears upon the ring 16 so that the latter urges the friction disc 17 against that side of the primary mass 1 which faces away from the engine of the motor vehicle.

The means for connecting the two portions of the planet carrier 9 to each other comprises a set of hollow sleeve-like shafts 18 which are disposed at the same radial distance from the axis 54 and each of which mounts a discrete pinion 20 of the planetary. The axes of the shafts 18 are parallel to the axis 54 and each such shaft has a radially outwardly extending collar 21 engaging the outer side of the left-hand portion of the carrier 9 (as viewed in FIG. 2). The shafts 18 are tapped and their internal threads mate with the external threads of fasteners 22 having heads which abut the exposed side of the right-hand portion of the carrier 9 (as viewed in FIG. 2). This ensures that the two portions of the carrier 9 are maintained at a desired axial distance from each other and the shafts 18 can rotatably support the respective pinions 20. Each such pinion meshes with the sun gear 7 and with an internal gear 24 of the planetary. The latter is mounted in the radially outer section of the carrier 9 and is affixed to a ring 26 by threaded fasteners 25. The ring 26 surrounds the internal gear 24 as well as the radially outermost parts of the two portions of the planet carrier 9.

The internal gear 24 is provided with several (for example, three) equidistant cutouts or windows 27 which are disposed radially outwardly of the pinions 20 and extend in the circumferential direction of the components 3 and 46. These windows receive three sets 28 of arcuate coil springs 30 which constitute an energy storing means cooperating with the planetary to form therewith a system or means for the transmission of torque between the masses 1 and 45.

Each of the illustrated sets 28 comprises at least three coil springs 30 and each such set is confined between a pair of mobile abutments 31 normally bearing against the adjacent shoulders 32 in the respective window 27. In other words, the abutments 31 can stress the springs 30 of the respective sets 28 when they are caused to move away from the respective shoulders 32. The springs 30 of each set 28 are separated from each other by shoes 33 which are slidable along the internal surface of the ring 26.

It is within the purview of the invention to replace each set 28 of several discrete relatively short coil springs 30 with a single elongated arcuate coil spring which has end convolutions normally abutting the two shoulders 32 in the respective window 27 of the internal gear 24. The axial length of each such relatively long coil spring can be a multiple (even a very large multiple) of the diameter of any of its convolutions. On the other hand, the diameter of a convolution of each of the illustrated relatively short coil springs 30 can be a rather substantial fraction (e.g., 25% or 50%) of its axial length. If each window 27 receives a single relatively long arcuate coil spring, such spring tends to move radially outwardly under the action of centrifugal force when the components 3 and 46 are caused to rotate, whereby the radially outer portions of at least some (median) convolutions of such elongated coil spring tend to bear against the internal surface of the radially outwardly adjacent part (such as the ring 26). This ring can constitute an equivalent of the wear-resistant linings disclosed in commonly owned U.S. Pat. No. 4,946,420 granted Aug. 7, 1990 to Johann Jäckel for "Apparatus for damping torsional vibrations". This patent (the disclosure of which is incorporated herein by reference) further discloses the advantages of employing elongated coil springs which are properly curved or bent or arched prior to insertion into a composite flywheel so that their curvature (prior to insertion) matches or at least approximates the required curvature subsequent to completion of the inserting operation. The patent to Jäckel further describes and shows the manner of affixing one mass of a composite flywheel to the rotary output element of a prime mover (such as a combustion engine), as well as the manner of securing the other mass of the composite flywheel to a rotary input element of a change-speed transmission, e.g., by way of a friction clutch.

The illustrated coil springs 30 are held against direct contact with the internal surface of the ring 26 by the shoes 33 each of which includes a radially inner portion extending between a pair of neighboring springs 30 and a radially outer portion abutting the internal surface or being close to such internal surface. The abutments 31 can also have radially outer portions which actually contact or are adjacent the internal surface of the ring 26.

Regardless of whether the ring 26 is engaged by the convolutions of coil springs or by shoes, there develops a frictional hysteresis which is a function of the centrifugal force and is effective in parallel with the springs 30 or with the aforementioned longer arcuate coil springs.

Regardless of whether the energy storing means comprises the illustrated sets 28 of several springs 30 each or longer arcuate coil springs, the springs can be dimensioned in such a way that they are installed in unstressed or practically unstressed condition. Such mounting in unstressed or practically unstressed condition is facilitated if the energy storing means comprises relatively long curved springs which are adequately arched prior to installation in the windows 27.

It is also possible to provide the springs 30 with flats of the type disclosed in published German patent application No. 44 06 826 and in the corresponding United States Letters Patent the disclosure of which is incorporated herein by reference.

The springs 30 of the three sets 28 further extend into recesses or windows 35 provided in each of the two portions of the two-piece carrier 9 at opposite sides of the windows 27 in the gear 24. The abutments 31 at the longitudinal ends of the sets 28 of coil springs 30 can engage the shoulders 36 at the longitudinal ends of the windows 35 in the two portions of the carrier 9 so that the springs 30 are compelled to store energy (or additional energy) when the internal gear 24 and the carrier 9 are caused to turn relative to each other in either direction. The reference characters 38 denote in FIGS. 1 and 2 composite windows or channels each of which includes a centrally located window 27 of the internal gear 24 and two windows 35 provided in the two portions of the carrier 9 at opposite sides of the respective window 27. Each such composite window or channel 38 receives a set 28 of end-to-end arranged coil springs 30.

The means for sealing the channels or chambers or compartments 38; for the sets 28 comprises a first plate-like sealing element 40 which (in the embodiment of FIGS. 1 and 2) is of one piece with the ring 26 and extends radially inwardly toward the axis 54. The radially inner portion of the sealing element 40 is located at the friction generating device 13. The other sides of the channels or chambers or compartments 38 are sealed by another plate-like sealing element 42 which is secured to the ring 26 and extends between the inner side of the secondary mass 45 and the adjacent portion of the planet carrier 9 all the way to the flange 8. The ring 26 and the two plate-like sealing elements 40, 42 together constitute a sealing device or sealing means 43 which defines a chamber or compartment 44, and such chamber or compartment is at least partially filled with a viscous material, such as a highly viscous oil or grease.

The chamber or compartment 44 is provided in the secondary mass 45 which latter thus confines or at least partially receives the two-piece planet carrier 9, the planet pinions 20, the sun gear 7 and the internal gear 24 of the planetary as well as the springs 30 of the three sets 28 together constituting the energy storing means of the improved torsional vibration damping apparatus. This secondary mass 45 is fixedly secured to the ring 26, and these two parts 26, 45 together constitute the second component 46 of the composite flywheel. This component 46 can constitute the flywheel (counterpressure plate) of a friction clutch which serves to transmit torque to the input element of a variable-speed transmission or another driven arrangement in a motor vehicle. Reference may be had again to the aforementioned U.S. Pat. No. 4,946,420 which illustrates a suitable friction clutch 7 having a counterpressure plate 4 (corresponding to the component 46 in FIGS. 1 and 2 of the present case) which is provided with a friction surface 4a engageable by the adjacent friction linings of a clutch disc 9. Such friction surface can be provided on the right-hand side of the mass 45 (as viewed in FIG. 2).

The constituents 7, 9, 20 and 24 of the planetary in the torsional vibration damping apparatus of FIGS. 1 and 2 are held in proper positions by the ring 26 and the plate-like sealing elements 40, 42. Another friction generating device 47 is provided to hold the ring 26 against undesirable axial movements, and such friction generating device comprises a friction ring 48 which is stressed in the direction of the axis 54 to operate between the mass 1 and the sealing element 40. The friction generating device 47 including the friction ring 48 can be said to constitute a means for locating the ring 26 in an optimum axial position between the masses 1 and 45;

such friction generating device ensures the development of a basic friction as soon as the intermediate mass 50 tends to turn relative to the primary mass 1 and/or vice versa. The magnitude or intensity of friction which is being generated by the device 47 depends on the distance of the friction ring 48 from the common axis 54 of the masses 1 and 45, i.e., upon the effective "friction radius" of the device 47.

The operation of the torsional vibration damping apparatus of FIGS. 1 and 2 is as follows:

If the primary mass 1 receives torque from the output element of a prime mover which drives the hub 4, the latter rotates the sun gear 7 which causes the planet pinions 20 to rotate about the axes of the respective shafts 18 because, at such time, the internal gear 24 is still held against rotation about the axis 54. Therefore, the rotating planet pinions 20 cause their carrier 9 to turn about the axis 54. This entails a division or breaking up of the torque which is being transmitted by the primary mass 1 into a first portion (first partial torque) which is being transmitted to the pinions 20 and thence to the carrier 9 (intermediate mass 50), and a second portion (second partial torque) which is being transmitted to the internal gear 24. For example, if the torque which is being transmitted by the primary mass 1 causes the sun gear 7 to rotate in a clockwise direction (as viewed in FIG. 1), the aforementioned first partial torque is effective to initiate a rotation of the planet pinions 20 in a counterclockwise direction and the pinions 20 cause the carrier 9 to turn in a clockwise direction.

The two portions of the torque being transmitted by the primary mass 1 oppose each other and each of these portions can be greater than the torque which is being applied to the mass 1. However, such portions of the torque are superimposed upon each other when they are transmitted to the secondary mass 45 so that the torque being transmitted by the mass 45 to a clutch disc or another rotary element (plus the losses due, for example, to friction developing in the improved apparatus) matches or closely approximates the torque being transmitted to the primary mass 1. However, the torque which is being transmitted by the secondary mass 45 is at least substantially free of undesirable fluctuations or variations because such irregularities are absorbed by the springs 30 of the three sets 28 constituting the energy storing means acting between the planet carrier 9 (intermediate mass 50) and the internal gear 24 of the planetary. The energy storing means including the sets 28 of coil springs 30 permits an angular displacement of the internal gear 24 and the carrier 9 relative to each other to an extent which depends upon the extent of deformation (stressing) of the coil springs 30.

The function of the energy storing means including the three sets 28 of the coil springs 30 in the torsional vibration damping apparatus of FIGS. 1 and 2 is as follows: When the carrier 9 is caused (by the planet pinions 20) to turn relative to the internal gear 24 as a result of the transmission of torque from the primary mass 1 to the sun gear 7, the shoulders 36 of the carrier 9 cause the abutments 31 at the trailing ends of the sets 28 to move away from the respective shoulders 32 of the internal gear 24 so that the springs 30 are compelled to store energy and the shoes 33 slide along the internal surface of the ring 26. The extent of deformation of the coil springs 30 is determined by the selected ratio of the planetary, i.e., by the ratio of teeth on the sun gear 7 to the teeth in the gear 24.

The chamber 44 in the secondary mass 45 is at least partially filled with a preferably highly viscous material, and such viscous material is displaced in the chamber 44 not only because the planet pinions 20 rotate about the axes of the respective hollow shafts 18 relative to the sun gear 7 as well as relative to the internal gear 24 but also as a result of the deformation (stressing) of the coil springs 30. As the teeth of the rotating pinions 20 penetrate into the tooth spaces between the external teeth of the sun gear 7 and between the internal teeth of the gear 24, they displace viscous material in the direction of the axis 54, i.e., toward the adjacent sides of the two portions of the carrier 9. Due to rotation of the components 3 and 46 about the axis 54, the viscous material which has been displaced by the teeth of the pinions 20 tends to advance radially outwardly along the inner sides of the two portions of the carrier 9. Deformation (stressing) of the springs 30 in the channel 38 entails a movement of the spring convolutions nearer to each other as well as a movement of the shoes 33 in each set 28 toward each other (in the circumferential direction of the chamber 38), and this also entails a displacement of viscous material in the direction of the axis 54, i.e., toward the adjacent inner sides of the sealing elements 40 and 42. The rate at which the viscous material is being displaced by the teeth of the pinions 20 and by the coil springs 30 increases in response to increasing rotational speed of the pinions, and this results in an increasing resistance of viscous material to such displacement. In other words, the damping action of the viscous material increases proportionally with the rotational speed of the pinions 20 about their respective axes relative to the internal gear 24.

If the means for transmitting torque between the primary and secondary masses 1 and 45 includes the transmission including the parts 7, 9, 20 and 24, this leads to the generation of pronounced partial torques (first and second portions of torque being transmitted by the mass 1). The phase or stage during which the internal gear 24 does not rotate in response to rotation of the pinions 20 by the sun gear 7 is very short, i.e., the interval during which the primary mass 1 rotates relative to the secondary mass 45 and the carrier 9 is short or very short. This, in turn, entails that the damping action of viscous material in the chambers 38 and 44 is of short duration, i.e., the percentage of damping action furnished by the viscous medium in comparison to the damping action of the coil springs 30 is rather small. Therefore, the quality or intensity of the damping action of the apparatus which is shown in FIGS. 1 and 2 is not overly affected if the internal gear 24 and/or the planet pinions 20 are installed externally of the chamber 44, such as in a recess 51 which is provided in one of the masses 1 and 45.

When the pinions 20 complete that angular movement about the axes of the respective hollow shafts 18, i.e., relative to the internal gear 24, which is necessary to move (against the opposition of the springs 30) the projections 10 on the left-hand portion (as viewed in FIG. 2) of the carrier 9 the full length of the sockets 12 of the friction generating device 13, any further angular displacement of the carrier 9 under the action of the pinions 20 causes the friction ring 17 to slide relative to the mass 1 or the intermediate ring 16 to slide relative to the friction ring 17 and the mass 1. In either event, the friction ring 17 opposes rotation of the carrier 9 relative to the mass 1 and can cause a deceleration of the carrier or prevents any further rotation of the carrier. The percentage of the thus established hysteresis upon the torsional vibration damping action is dependent upon the design and dimensioning of the planetary. Thus, if the ratio of the planetary is such that the carrier 9 tends to carry out large angular movements relative to the primary mass 1, this results in a longer-lasting frictional damping action of the friction generating device 13. On the other hand, if the ratio of the planetary is such that the planetary causes the establishment of large partial torques, and if the friction generating device 13 employs a rather strong diaphragm spring 15 (i.e., a diaphragm spring which is installed in a highly compressed or stressed condition, as seen in the direction of the axis 54), it is possible to regulate the torsional vibration damping operation with a higher degree of accuracy and reliability.

In the apparatus of FIGS. 1 and 2, the friction ring 48 of the locating means 47 on the primary mass 1 is in uninterrupted frictional engagement with the adjacent sealing element 40, i.e., with the ring 26. This means that the locating means 47 opposes each and every angular displacement of the masses 1 and 45 relative to each other.

If the functions of the components 3 and 46 are reversed, i.e., if the vehicle whose engine normally drives the primary mass 1 is coasting, the wheels drive the secondary mass 45 which causes the ring 26 to rotate the internal gear 24 which rotates the planet pinions 20 about the axes of their respective shafts 18 so that the pinions roll along the external teeth of the sun gear 7. Rotation of the sun gear 7 is shared by the mass 1 which transmits torque to the output element of the engine. It will be appreciated that the ratio of the planetary is different when the vehicle is coasting because the internal gear 24 then causes the pinions 20 to rotate the sun gear 7 whereas, when the sun gear 7 is driven by the primary mass 1 (i.e., by the engine), the pinions 20 are caused to rotate the internal gear 24. The reason is that the number of internal teeth of the gear 24 is different from the number of external teeth of the gear 7.

When the relative speeds are rather high, it is advisable to install the parts of the planetary in the chamber 44, i.e., in the component 46. An advantage of such mounting is that the magnitude of the speed at which one of the masses 1, 45 turns relative to the other of these masses cannot influence the sealing action for the supply of viscous medium within the sealing means 43 because all parts (40, 42, 26) of such sealing means rotate with the mass 45.

The ring 26 constitutes a means for fixedly securing the internal gear 24 to the secondary mass 45 (by way of the fasteners 25 and additional fastener means (see FIG. 2) securing the ring 26 to the mass 45).

The provision of the planetary renders it possible to establish a number of locations for the mounting of friction generating means because there are numerous pairs of parts which are adjacent and can turn relative to each other.

If the ratio of the planetary is such that it causes the generation of large partial torques, the friction generating device 13 can employ a strong diaphragm spring 15 the bias of which can be selected with a high degree of accuracy. If the partial torques are small or relatively small but the angular speeds are high, it is presently preferred to employ a weaker diaphragm spring 15 (the bias of which cannot or need not be regulated with a high degee of accuracy) and to rely on longer distances of operation or effectiveness of the friction generating device 13.

Depending upon the exact design of the improved torsional vibration damping apparatus, the energy storing means (such as the springs 30 or their equivalents) can be installed to operate between the masses 1 and 45 or 1 and 50 or 45 and 50 or between the parts of the planetary or between one or more selected parts of the planetary and the mass 1 and/or 45.

Figure 3:
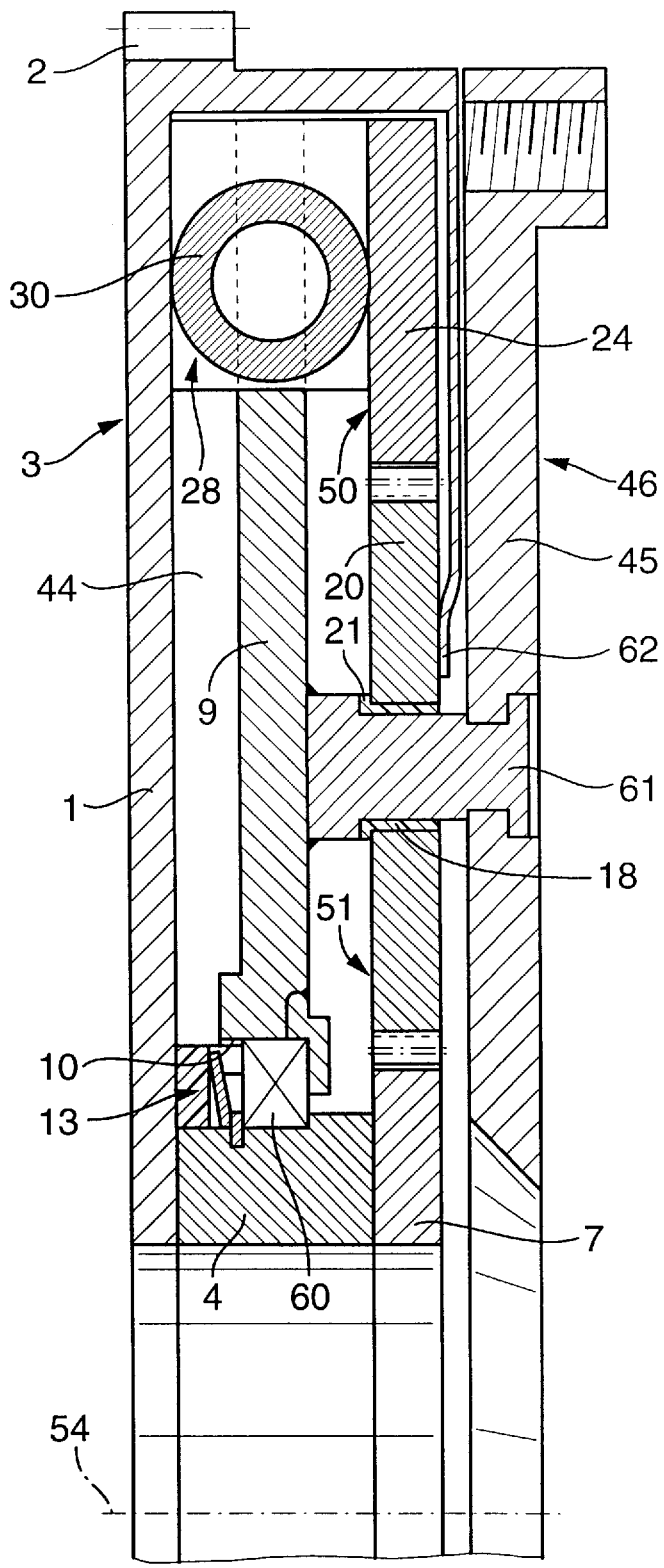
FIG. 3 is a fragmentary sectional view of a modified torsional vibration damping apparatus.

Referring to FIG. 3, there is shown a portion of a torsional vibration damping apparatus which constitutes a first modification of the aforedescribed apparatus of FIGS. 1 and 2. A difference between the two apparatus is that the energy storing means including the springs 30 shown in FIG. 3 operates between the primary mass 1 and the planet carrier 9 which is centered on the hub 4 by a suitable bearing 60 (e.g., an antifriction bearing with one or more annuli of balls or other sitable rolling elements between an inner race surrounding the hub and an outer race surrounded by the radially inner portion of the carrier 9). Connectors 61 in the form of pins, rivets or the like are provided to secure the carrier 9 to the secondary mass 45. The median portions of the connectors 61 (of which only one can be seen in FIG. 3) are surrounded by the sleeve-like shafts 18 for the planet pinions 20. The connectors 61 have first end portions welded to the carrier 9 and second end portions anchored in the mass 45. Intermediate portions of the connectors 61 have shoulders which maintain the collars 21 of the shafts 18 in abutment with the adjacent sides of the respective planet pinions 20. The shafts 18 need not be provided with internal threads. The flywheel 1 has a radially inwardly extending portion or wall 62 which is adjacent the right hand sides of the pinions 21 to hold the pinions in abutment with the collars 21 of the respective shafts 18.

The pinions 20 mesh with the sun gear 7 which is affixed to the hub 4 (i.e., to the primary mass 1), and these pinions further mesh with the internal gear 24 which is adjacent the radially outermost portion of the wall 62 and is located within the confines of the mass 1.

The apparatus of FIG. 3 further comprises a friction generating device 13 which operates between the mass 1 and the planet carrier 9. One or more additional friction generating devices (not shown) can be provided between pairs of neighboring parts which can turn relative to each other, e.g., between the wall 62 and the secondary mass 45.

The chamber 44 in the apparatus of FIG. 3 is defined by the primary mass 1 (i.e., the component 3) and its radially extending wall 62, and such chamber is at least partially filled with a supply of viscous material. The planet pinions 20 cooperate with the internal gear 24 and with the sun gear 7 to reduce the likelihood of undesired escape of viscous material from the chamber 44. This chamber further receives the sets 28 of the coil springs 30 constituting the energy storing means in the apparatus of FIG. 3. As already described in connection with FIGS. 1 and 2, the viscous material in the chamber 44 can furnish a damping action which is proportional with the rotational speed. A major part of the sealing action for the confined viscous material is furnished by the component 3, i.e., by the primary mass.1 and its radially inwardly extending wall 62.

When the component 3 is driven by the output element of a prime mover, the primary mass 1 initially turns relative to the secondary mass 45 of the component 46 about ther common axis 54. A first portion of the torque which is transmitted by the primary mass 1 is being applied to the planet pinions 20 and thence to the internal gear 24. The second portion of such torque is being applied to the carrier 9 via connectors 61. This entails the development of an angular movement between the carrier 9 and the primary mass 1, i.e., the springs 30 of the sets 28 are caused to store energy.

The internal gear 24 constitutes the intermediate mass 50 of the apparatus which is shown in FIG. 3. The two portions of transmitted torque are superimposed upon each other to furnish a resultant torque which is transmitted to the secondary mass 45 of the component 46 by way of the connectors 61. The same as in the apparatus of FIGS. 1 and 2, the direction of action of the torque being transmitted to the primary mass 1 of FIG. 3 is counter to the direction of action of partial torque at the pinions 20 and the internal gear 24 but the same as the direction of action of partial torque being applied to the carrier 9.

Figure 4:
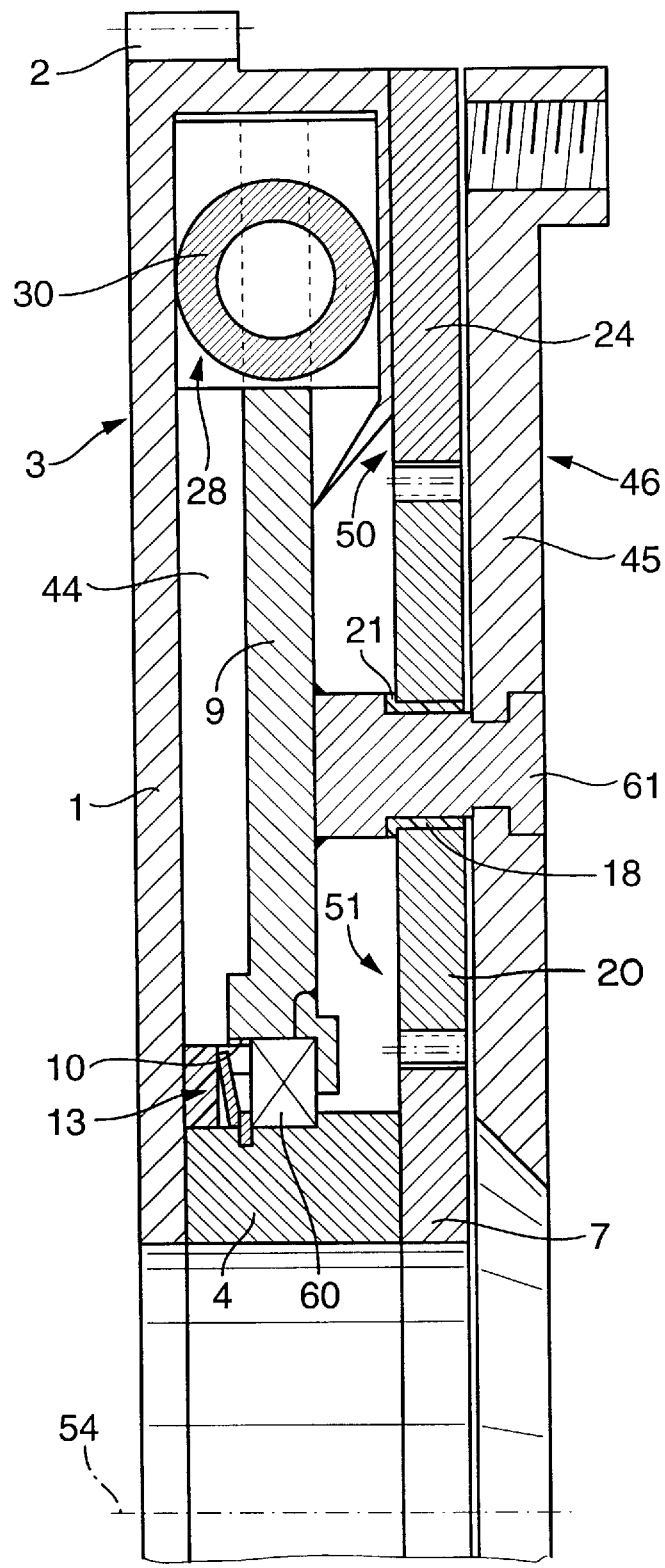
FIG. 4 is a similar fragmentary sectional view of an apparatus constituting a modification of the apparatus shown in FIG. 3.

FIG. 4 illustrates a portion of an apparatus which constitutes a modification of the torsional vibration damping apparatus of FIG. 3. An important difference between these apparatus is that the capacity of the chamber 44 in the component 3 of FIG. 4 is selected with a view to accommodate the sets 28 of coil springs 30 but not the internal gear 24 and the pinions 20 of the planetary. The parts 20 and 24 are received in a chamber, recess or compartment 51 at the right-hand side of the planet carrier 9 (as viewed in FIG. 4). The compartment 51 is adjacent the chamber 44, as seen in the direction of the common axis 54 of the components 3 and 46.

The embodiment of FIG. 4 can be put to use when the ratio of the planetary is such that the angular speed of the pinions 20 is low so that the damping action of such pinions in combination with the viscous material in the chamber 44 is relatively weak or plain negligible. It is to be recalled that the damping action of the confined viscous material is dependent upon the rotational speed of the planet pinions.

The reference numerals shown in FIGS. 3 and 4 but not specifically mentioned in connection with the descriptions of the apparatus shown in FIGS. 3 and 4 denote parts which are identical with or clearly analogous to the similarly referenced parts of the apparatus shown in FIGS. 1 and 2. This also holds true for the embodiments which will be described with reference to FIGS. 5 through 15.

Figure 5:
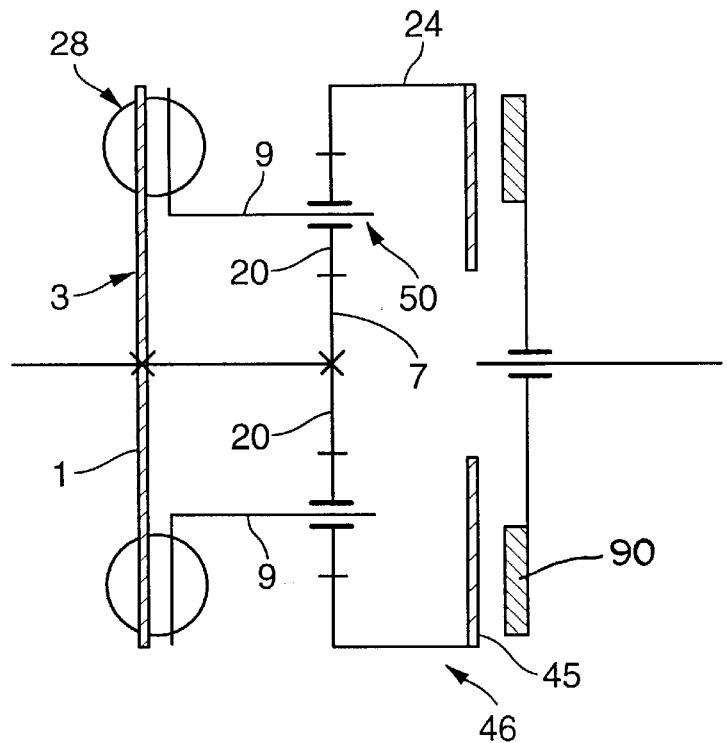
FIG. 5 is a schematic sectional view of a further torsional vibration damping apparatus which embodies the present invention.

FIG. 5 shows schematically certain component parts of a further torsional vibration damping apparatus wherein the sets 28 of springs (such as the coil springs 30 in the apparatus of FIGS. 1 and 2) are installed to operate between the primary mass 1 of the component 3 and the carrier 9 for the planet pinions 20 of the planetary. The pinions 20 mesh with the centrally located sun gear 7 and with the internal gear 24 which is connected with the secondary mass 45 of the component 46. The carrier 9 constitutes the intermediate mass 50 and is accelerated by one of the two partial torques transmitted by the primary mass 1 when the latter is driven by the output element of a prime mover.

Figure 15:
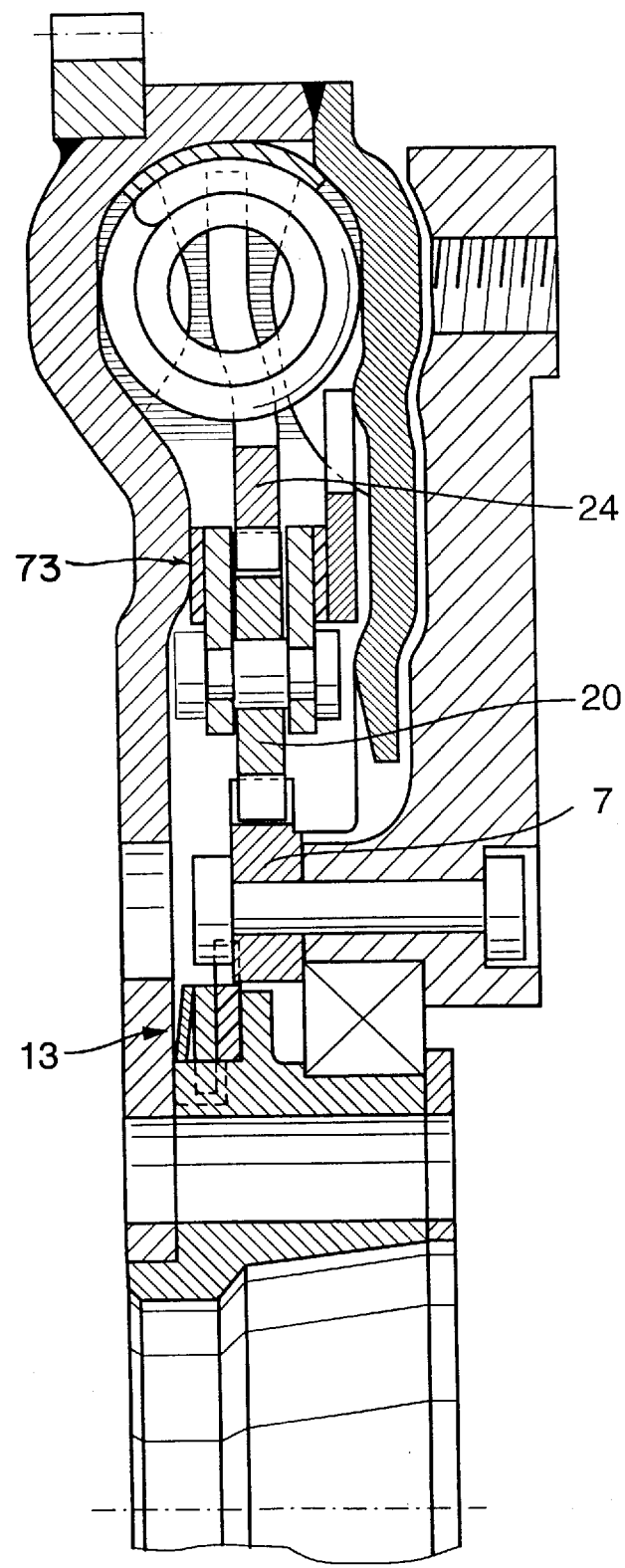
FIG. 15 is a fragmentary sectional view of a modification of the apparatus which is shown in FIG. 14.

The right-hand portion of FIG. 15 shows a clutch disc 90 which forms part of a friction clutch between the apparatus of FIG. 5 and a change-speed transmission and which is rotated by the mass 45 when the friction surface at the right-hand side of the mass 45 is engaged by a friction lining of the clutch disc 90, e.g., under the action of an axially reciprocable pressure plate corresponding to the pressure plate 8 in FIG. 1 of U.S. Pat. No. 4,946,420 to Jäckel.

Figure 6:
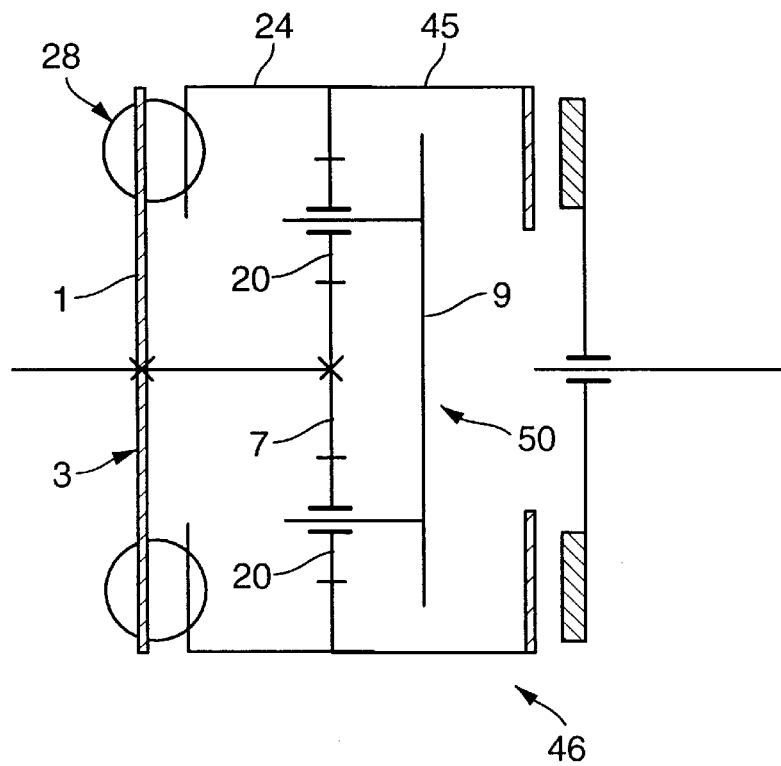
FIG. 6 is a similar schematic sectional view of another apparatus.

FIG. 6 illustrates a portion of a torsional vibration damping apparatus wherein, in contrast to the apparatus of FIG. 5, the sets 28 of springs constituting the energy storing means operate between the primary flywheel 1 of the component 3 and the internal gear 24 of the planetary. The internal gear 24 is rigid with the secondary mass 45 of the component 46. The carrier 9 again constitutes the intermediate mass 50 and supports a set of pinions 20 which mesh with the internal gear 24 as well as with a sun gear 7 of the planetary. The sun gear 7 is coaxial with and is secured to the primary mass 1. The intermediate mass 50 (carrier 9) is borne by the pinions 20 and is acceleratable by one of the two portions of torque being transmitted by the component 3.

Figure 7:
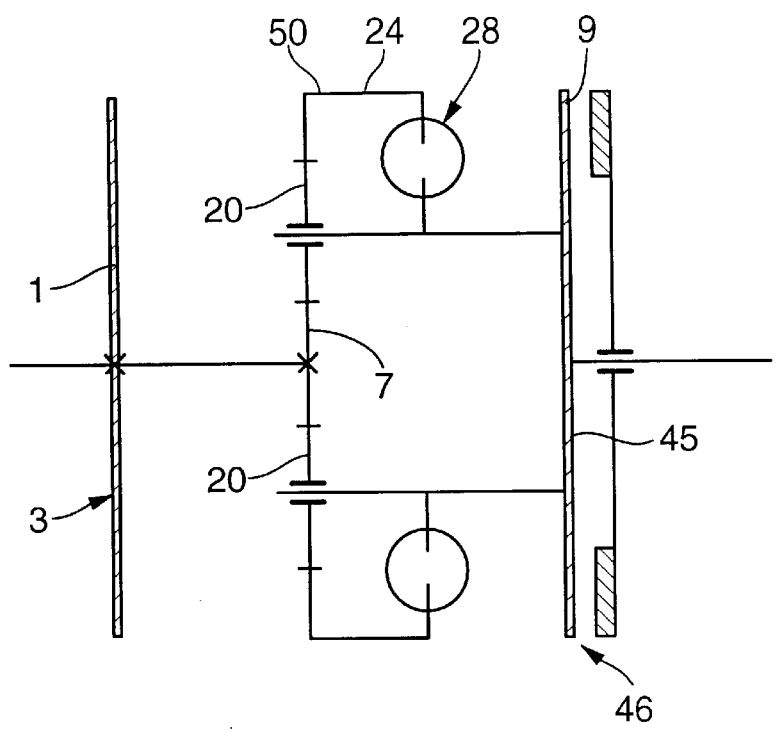
FIG. 7 is a similar schematic sectional view of still another apparatus.

FIG. 7 illustrates certain details of a further torsional vibration damping apparatus which constitutes an additional modification of the previously described apparatus. Thus, the sets 28 of springs forming part of the energy storing means are installed to operate between the internal gear 24 and the carrier 9 of the planetary, i.e., between the internal gear 24 and the secondary mass 45 which is rigid with the carrier 9. It will be seen that, in contrast to the construction and operation of the previously described apparatus, the energy storing means including the sets 28 of springs shown in FIG. 7 operates at the output side of the apparatus. The carrier 9 forms part of the component 46 (i.e., of the mass 45), and the internal gear 24 constitutes the intermediate mass 50 which is coupled to the primary mass 1 by the energy storing means. The sun gear 7 is affixed to and coaxial with the primary mass 1.

Figure 8:
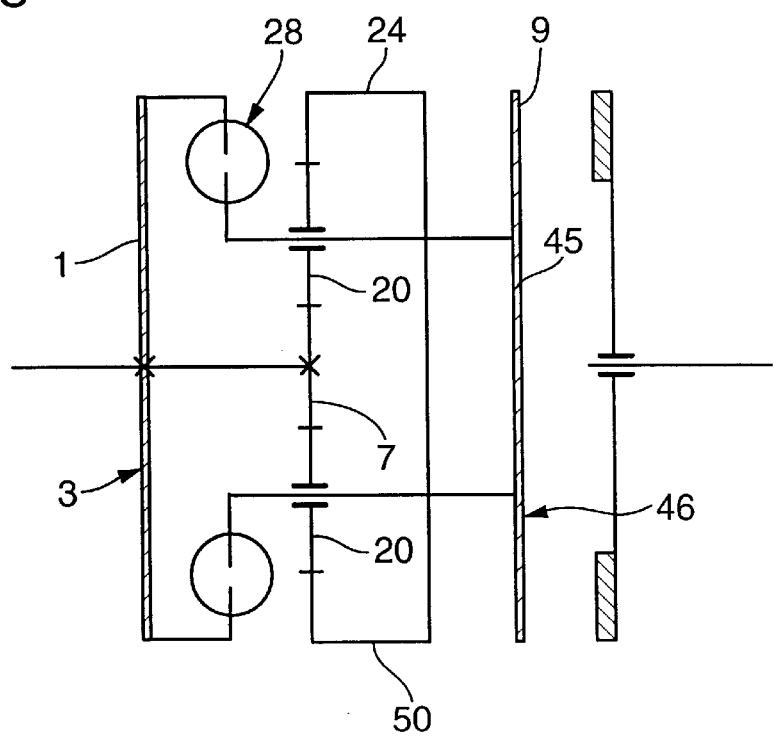
FIG. 8 is a similar schematic sectional view of a further apparatus.

In the apparatus of FIG. 8, the sun gear 7 of the planetary is affixed to the primary mass 1 of the component 3, and the carrier 9 of the planetary is affixed to or constitutes the secondary mass 45 of the component 46. The energy storing means including the sets 28 of coil springs or other suitable resilient elements is installed to operate between the primary mass 1 and the secondary mass 45, i.e., between the mass 1 and the planet carrier 9. Thus, and in contrast to the embodiment of FIG. 7, the energy storing means including the sets 28 is installed to operate at the input side of the torsional vibration damping apparatus of FIG. 8.

The improved apparatus can utilize several energy storing means, for example, a first energy storing means at the input side (as shown in FIGS. 1 to 6 and 8) and a second energy storing means at the output side (as shown in FIG. 7). The basic mode of operation of all of the aforedescribed apparatus is the same. Thus, the torque being transmitted to the primary mass 1 is split into two partial torques one of which is branched off to the secondary mass 45 and the other of which is branched off to the intermediate mass 50. The latter can include or be constituted by the internal gear 24 of by the planet carrier 9. The two partial torques are merged into an output torque which is transmitted by the secondary mass 45. Due to the provision of one or more energy storing means, the two partial torques effect an angular movement of the primary and secondary masses 1, 45 relative to each other and the fluctuations of torque being transmitted to the input mass 1 are either reduced or eliminated due to the action of the planetary, due to the action of the energy storing means as well as due to the action of one or more friction generating devices.

Figure 9:
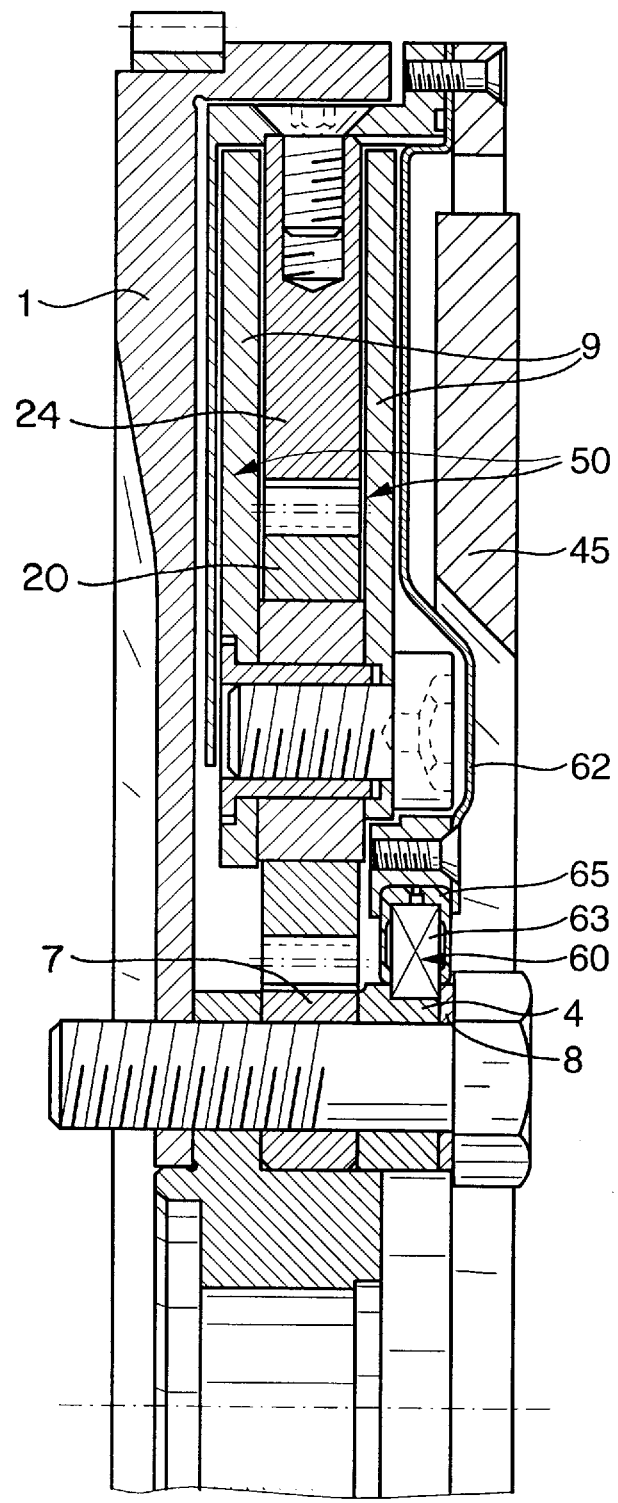
FIG. 9 is a fragmentary sectional view of an additional apparatus.

Referring to FIG. 9, there is shown a portion of a further torsional vibration damping apparatus wherein the hub 4 is surrounded by the inner race of a schematically illustrated antifriction bearing 60 having an outer race which is surrounded by a radially inwardly extending wall or support 62 carried by the secondary mass 45. The outer race of the bearing 60 is directly surrounded by one or more thermal insulators 65 which reduce or prevent the transfer of heat from the secondary mass 45 (which is assumed to constitute the counterpressure plate of a friction clutch and is heated as a result of slippage of friction linings of the clutch disc relative to the pressure plate and/or counterpressure plate) to the races and to the rolling elements 63 of the bearing 60. The thermal insulator 65 can constitute a circumferentially complete part or a composite part and can have a substantially L-shaped cross-sectional outline.

The wall or support 62 can form part of or (as actually shown in FIG. 9) can be affixed to the secondary mass 45.

The hub 4 has an external shoulder which cooperates with the radially outermost portion of the flange 8 to maintain the inner race of the antifriction bearing 60 in the illustrated optimal axial position relative to the thermal insulator 65, wall or support 62 and hub 4. The outer race of the bearing 60 is held in a desired axial position by a radially inwardly extending portion of the wall or support 62 and by one leg of the thermal insulator 65 which is recessed into the radially inner portion of the part 62.

Figure 10:
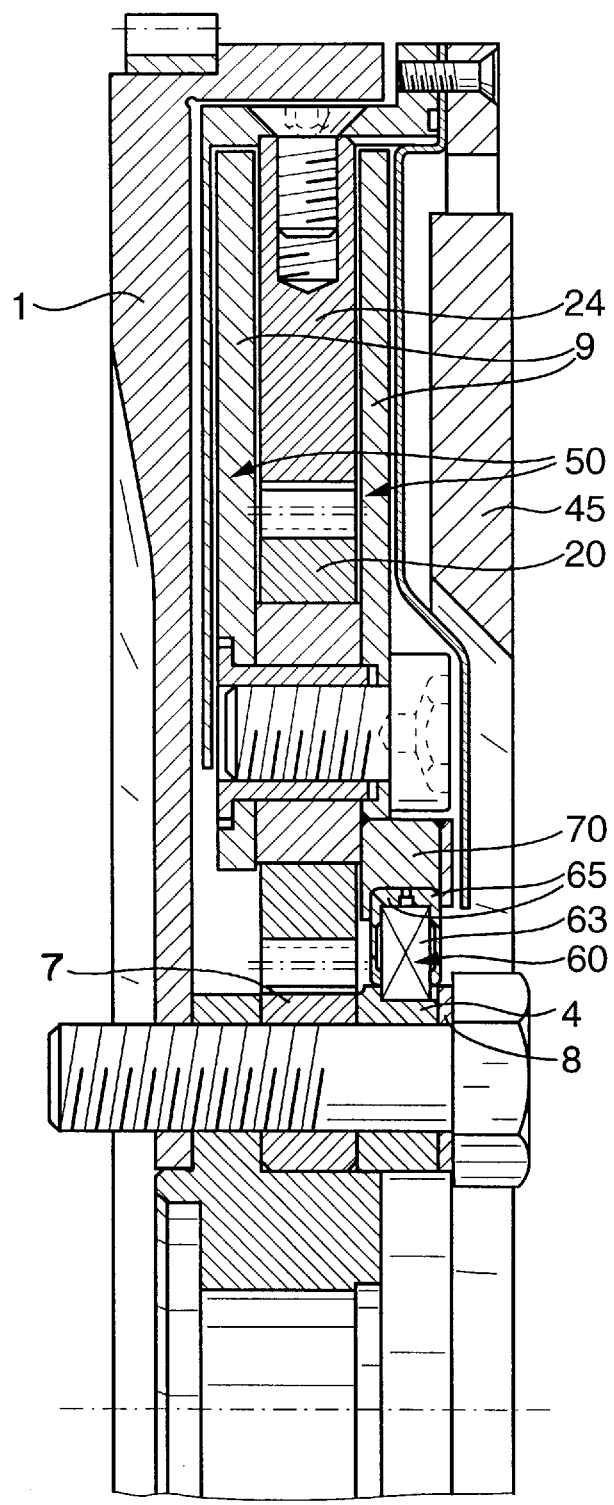
FIG. 10 illustrates a modification of the structure which is shown in FIG. 9.

An advantage of the bearing 60 is that it ensures an optimal axial positioning of the pinions 20, internal gear 24 and sun gear 7 of the planetary relative to each other without the development of unbalanced masses in spite of the need for some play between the teeth of the pinions 20 on the one hand and those of gears 7,24 the other hand, FIG. 10 illustrates a portion of a torsional vibration damping apparatus which differs from the apparatus of FIG. 9 in that the antifriction bearing 60 is installed between the hub 4 and the right-hand portion (as viewed in FIG. 10) of the two-piece carrier 9 for the pinions 20 of the planetary. The right-hand portion of the carrier 9 has a ring-shaped radially inner part 70 which surrounds the thermal insulator 65 and maintains it in a proper radial and axial position relative to the outer race of the bearing 60 including the rolling. elements 63 and further having an inner race which is held in a selected axial position by an external shoulder of the hub 4 and the flange 8. The just described mounting of the bearing 60 again ensures that no unbalanced masses develop when the planet pinions 20 mesh with and roll along the internal gear 24 and the sun gear 7 of the planetary.

Figure 11:
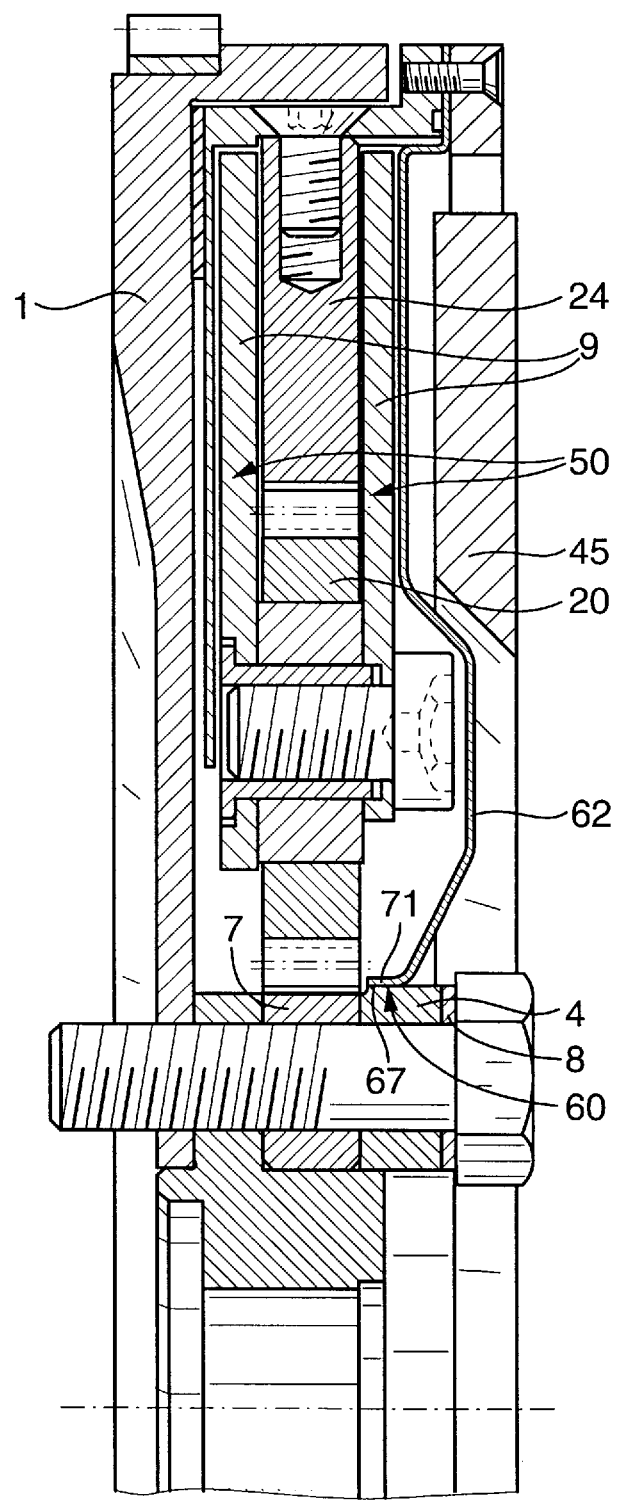
FIG. 11 is a fragmentary sectional view of another modification of the improved apparatus.

FIG. 11 illustrates a rudimentary (friction) bearing 60 in an apparatus which, in other respects, is similar to or practically identical with the apparatus of FIG. 9 or 10. The wall or support 62 of the apparatus which is shown in FIG. 11 extends radially inwardly, and its radially innermost portion constitutes a collar 71 which forms part of the friction bearing and slidably engages the adjacent portion 67 of the external surface of the hub 4 which is located between the sun gear 7 and the flange 8. The bearing 60 of FIG. 11 is designed to establish a metal-to-metal contact between the wall or support 62 and the hub 4. However, it is possible (and often desirable) to insert a ring (e.g., a plastic ring, not shown) between the collar 71 and the surface 67 of the hub 4.

It will be noted that the friction bearing 60 of FIG. 11 has a minimal (negligible) width as measured radially of the common axis of the masses 1 and 45. Otherwise stated, the wall or support 62 of the secondary mass 45 is closely (immediately) adjacent the hub 4.

Figure 12:
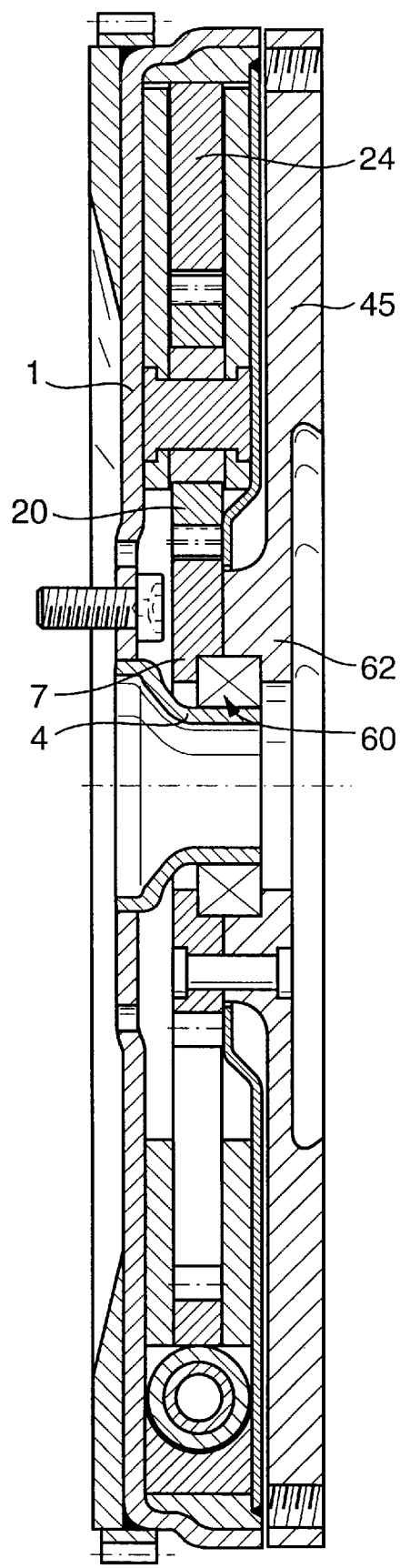
FIG. 12 is a sectional view of an apparatus constituting a modification of the apparatus which is shown in FIG. 11.

FIG. 12 shows a portion of an apparatus wherein the hub 4 is relatively thin and includes a larger-diameter portion within the primary mass 1 and a smaller-diameter portion surrounded by an antifriction bearing 60 which, in turn, is surrounded by the radially inwardly extending wall or support 62 of the secondary mass 45 as well as by the radially inner portion of the sun gear 7. The illustrated bearing 60 of FIG. 12 can be replaced by an antifriction bearing having a width (as measured radially of the common axis of the masses 1 and 45) which is a small fraction of width of the illustrated bearing, or by an even thinner friction bearing. All that counts is to provide a bearing which can prevent the development of unbalanced masses when the planetary using the meshing pinions 20 and gears 7, 24 is in use. This is accomplished by ensuring that the relative positions of the component parts of the planetary (as seen radially of the common axis of the masses 1 and 45) do not change at all or do not change beyond a permissible extent.

Figure 13:
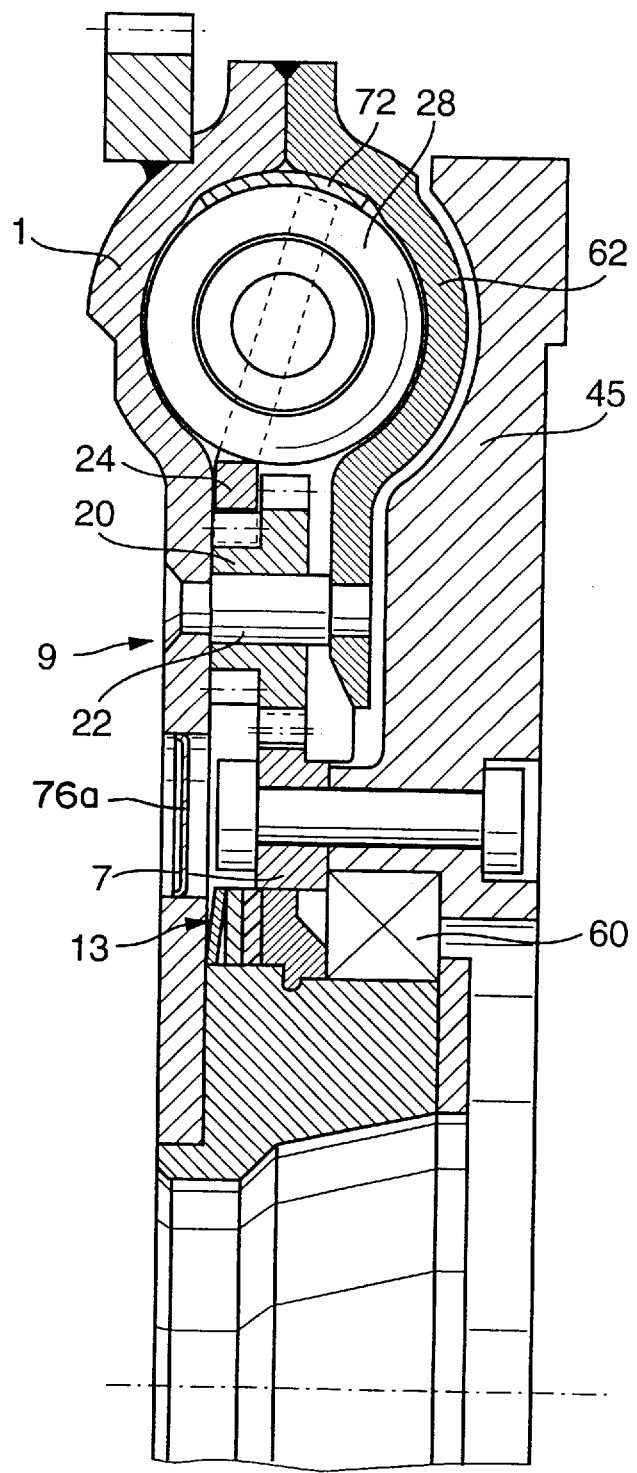
FIG. 13 is a fragmentary sectional view of an apparatus which embodies another form of the invention.

Referring to FIG. 13, there is shown an apparatus wherein the carrier 9 of the planetary forms part of the primary mass 1 which is rigidly connected to or of one piece with the radially inwardly extending wall 62. The shafts for the planet pinions 20 are constituted by rivets 22 each having one end portion anchored in the mass 1 and another end portion anchored in the wall 62. The inner sides of the mass 1 and wall 62 rather closely surround the sets 28 of energy storing elements forming part of the energy storing means acting between the internal gear 24 and the mass 1. The pinions 9 mesh with the internal gear 24 and with the sun gear 7 which, in this embodiment of the improved apparatus, is bolted, riveted or otherwise non-rotatably affixed to the secondary mass 45. The sets 28 of coil springs forming part of the energy storing means are disposed radially outwardly of the pinions 20 which, in turn, are installed radially outwardly of the friction generating device 13.

The reference character 72 denotes a wear-resistant liner no shield which is installed in the chamber of the primary mass 1 radially outwardly of the sets 28 of coil springs forming part of the energy storing means. As already pointed ou hereinbefore, the energy storing means tends to move radially outwardly under the action of centrifugal force and to rub against the radially outwardly adjacent part or parts when the springs of such energy storing means are forced to slide relative to the parts which cause the springs to store energy in response to angular movements of the primary mass 1 and the secondary mass 45 relative to each other. Reference may be had to the published German patent application No. 37 45 117 and to corresponding United States Letters Patent the disclosure of which is incorporated herein by reference.

In view of its rigid connection with the secondary mass 45, the sun gear 7 of the planetary shown in FIG. 13 can be considered as a part of the component including the mass 45.

The planetary which is utilized in the apparatus of FIG. 13 has two stages. This is due to the fact that each pinion 20 includes a first portion meshing with the internal gear 24 and a different second portion meshing with the sun gear 7. The number of teeth on the second portion of each pinion 20 is greater than the number of teeth on the first portion which is coaxial with the second portion. The ratios of the planetary can differ to a desired extent depending upon the relationship between the numbers of teeth on the first and second portions of the pinions 20. The overall ratio of the planetary of FIG. 13 is assumed to have been increased by 1.3.

The bearing 60 is installed between the hub of the primary mass 1 and the radially inner portion of the secondary mass 45 of the apparatus which is shown in FIG. 13. The function and the advantages of such bearing are the same as those described in connection with the embodiments shown in FIGS. 1 to 12.

Figure 14:
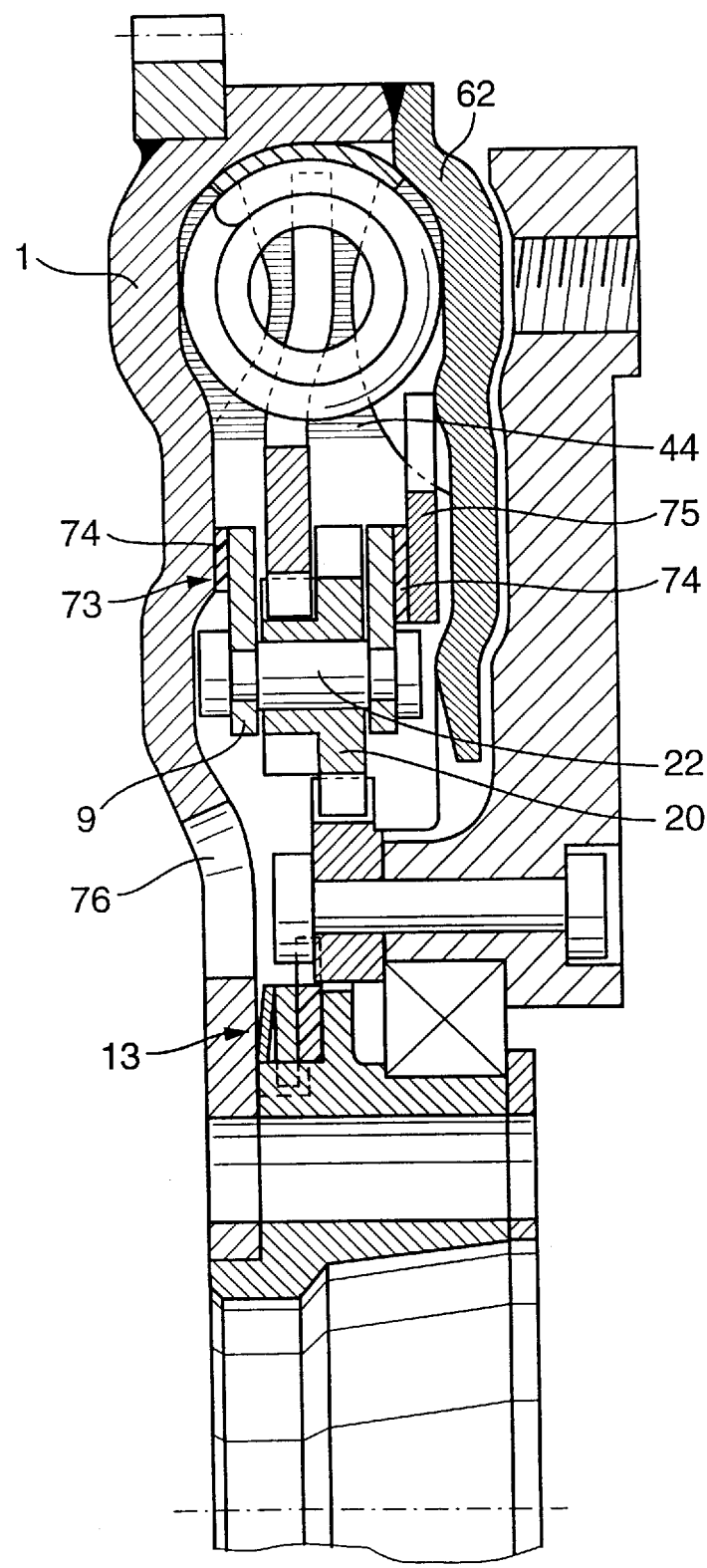
FIG. 14 is a fragmentary sectional view of another torsional vibration damping apparatus.

The apparatus of FIG. 14 is similar to that of FIG. 13 but it further comprises a torque limiting means 73 in the form of a slip clutch operating between the primary mass 1 and the carrier 9 for the pinions 20 of the planetary. Each such pinion is or can be constructed in the same way as described in connection with the apparatus of FIG. 13. The carrier 9 in the apparatus of FIG. 14 is a separately produced part which is disposed between the primary mass 1 and the wall 62 of the latter and carries rivets 22 serving as shafts for the pinions 20. The torque limiting means (slip clutch) 73 includes two friction linings 74, one between the mass 1 and the left-hand portion of the carrier 9 and the other between the wall 62 and the right-hand portion of the carrier 9. The friction linings 74 are optional, i.e., the two halves or portions of the composite carrier 9 can bear directly against the inner side of the primary mass 1 and against the left-hand side of the wall 62. The torque limiting means or slip clutch 73 further comprises a diaphragm spring 75 which reacts against the wall 62 and bears against the right-hand lining 74; this causes the shafts 22 (one shown in the form of a rivet) to urge the left-hand lining against the mass 1 through the medium of the left-hand portion of the carrier 9. The bias of the diaphragm spring 75 in the direction of the common axis of the mass 1 and the other masses determines the slip torque, i.e., the limit of the magnitude of torque being transmittable from the primary mass to the secondary mass of the apparatus of FIG. 14. The illustrated diaphragm spring 75 is installed in such a way that its radially outer portion reacts against the wall 62 and that its radially inner portion bears against the adjacent friction lining 74, i.e., against the right-hand portion of the carrier 9.

An important advantage of the slip clutch 73 (an equivalent of such slip clutch is preferably installed in each embodiment of the improved apparatus) is that it protects the apparatus against excessive stresses such as excessive peak loads which could develop, for example, in the event of resonance. It is preferred to select the maximum torque which is transmissible before the slip clutch 73 becomes active in such a way that it at least matches the maximum permissible torque of the engine which drives the primary mass 1.

The chamber 44 which is defined by the mass 1 and its wall 62 is at least partially filled with a supply of viscous material. The slip clutch (torque limiting means) 73 can serve the additional function of constituting a sealing means for the chamber 44 or of contributing to a sealing action which prevents uncontrolled escape or expulsion of viscous medium from the chamber 44. This renders it possible to eliminate the need for a stopper in the opening 76; such opening can serve as a means for permitting the introduction of viscous material into the chamber 44. However, it is also possible to employ a suitable stopper or other sealing means, such as the stopper 76a shown in FIG. 13. It is to be noted that the stopper 76a of FIG. 13 can constitute an optional component part of the respective apparatus because the consistency of the viscous material (e.g., grease) can be readily selected in such a way that it does not exhibit any (or any appreciable) tendency to flow radially inwardly toward the opening or openings (such as the opening 76 in the apparatus of FIG. 14).

The apparatus of FIG. 15 is practically identical with the apparatus of FIG. 14 except that it employs a planetary with simpler (single-stage) pinions 20. Thus, the ratio of the planetary in the apparatus of FIG. 15 is determined by the relations between the numbers of teeth on the internal gear 24 and the sun gear 7. The apparatus of FIG. 15 also employs a torque limiting means in the form of a slip clutch 73 disposed radially outwardly of a friction generating device 13.

FIGS. 14 and 15 show that the carrier 9 of the planetary can cooperate with the slip clutch 73; in fact, this carrier can be said to form part of the torque limiting means. Such torque limiting means 73 operates between the primary mass 1 and the intermediate mass (carrier 9). It is also possible to provide torque limiting means which operates between the intermediate mass 50 and the secondary mass 45 and/or between the primary and secondary masses or between the intermediate mass and the secondary mass, or to provide a plurality of torque limiting means (e.g., one between the primary and intermediate masses as shown in FIGS. 14 and 15 and another between the primary and secondary masses).

It is normally preferred to employ at least one torque limiting means which employs one or more friction linings (such as 74); this renders it possible to more accurately select the friction coefficient of a slip clutch.

In each of the illustrated embodiments of the improved torsional vibration damping apparatus, the friction clutch 13 and/or an equivalent friction clutch can be constructed, assembled and installed in such a way that it is effective during each and every stage or only during certain stages of angular movement of the primary and secondary masses relative to each other. For example, and as actually shown in the drawings, the friction clutch 13 can be designed in such a way that it becomes effective upon completion of certain initial angular displacement of the primary and secondary masses 1 and 45 relative to to each other (depending upon the length of the projection 10 and recess 12, as seen in the circumferential direction of the components 3 and 46).

It is often desirable to employ a friction generating device which is form-lockingly connected (if necessary with a preselected play) to the secondary mass 45.

Furthermore, it is also often desirable to provide means for shielding the planetary against overstressing. Such shielding means can comprise one or more stops which are designed to operate in parallel with the planetary. The shielding means may (but need not) contain a resilient material (e.g., a suitable elastomeric material which is capable of absorbing shocks).

The improved torsional vibration damping apparatus can be utilized in existing models of motor vehicles as a superior substitute for presently employed composite flywheels.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of torsional vibration damping apparatus and, therefore, such adaptations should and are intended to be comprehended within the meaning and range of equivalence of the appended claims.

What is claimed is:

1. A torsional vibration damping apparatus comprising first and second masses rotatable with and relative to each other about a common axis; means for transmitting torque between said masses, including energy storing means acting in a circumferential direction of said masses, and a planetary; and means for limiting the magnitude of the torque which is transmittable between said masses by said torque transmitting means.

2. The apparatus of claim 1, further comprising means for connecting one of said masses to a rotary component of a prime mover, and means for connecting the other of said masses with a rotary component of a transmission.

3. A torsional vibration damping apparatus comprising a rotary torque transmitting first component; a torque receiving second component rotatable with and relative to said first component about a common axis; means for transmitting torque between said components comprising (a) energy storing means and (b) a planetary including at least one carrier rotatable about said axis relative to said first component, at least one pinion rotatably mounted on said at least one carrier, an internal gear coaxial with said at least one carrier and meshing with said at least one pinion, and a sun gear meshing with said at least one pinion, one of said components being provided with means for stressing said energy storing means in response to rotation of said components relative to each other and said first and second components respectively having first and second masses rotatable at a plurality of speeds and relative to each other in clockwise and counterclockwise directions, said energy storing means being installed in at least one of said components to react against at least one of said masses and to bear against at least one intermediate mass forming part of said planetary and being rotatable about said axis at a velocity dependent upon said speed and upon the direction of rotation of at least one of said first and second masses relative to the other of said first and second masses; and means for limiting the magnitude of torque which is transmittable by said torque transmitting means from one of said first and second masses to the other of said first and second masses.

4. The apparatus of claim 3, wherein said at least one intermediate mass includes at least one of said sun gear, said at least one carrier and said internal gear.

5. The apparatus of claim 3, wherein said at least one pinion is operative to establish a connection between one of said first and second masses on the one hand and the other masses on the other hand, said energy storing means being arranged to couple one of said first and second masses with said at least one intermediate mass.

6. The apparatus of claim 3, wherein said energy storing means operates between said first and second masses and said at least one pinion couples said at least one intermediate mass with at least one of said first and second masses.

7. The apparatus of claim 3, wherein said at least one pinion couples one of said first and second masses with said at least one intermediate mass and said energy storing means operates between said first and second masses.

8. The apparatus of claim 3, wherein said internal gear forms part of one of said first and second masses and said at least one intermediate mass includes said at least one carrier.

9. The apparatus of claim 3, wherein one of said first and second masses includes said at least one carrier and said at least one intermediate mass includes said internal gear.

10. The apparatus of claim 3, wherein one of said first and second masses defines a recess for a portion at least of said planetary.

11. The apparatus of claim 10, wherein said portion of said planetary includes said internal gear and said at least one carrier.

12. The apparatus of claim 10, wherein said recess includes an at least partially closed chamber for a supply of viscous material.

13. The apparatus of claim 12, further comprising means for at least partially sealing said chamber against the escape of said viscous material.

14. The apparatus of claim 13, wherein said planetary comprises a plurality of pinions which are spaced apart from each other in a circumferential direction of said components, said at least one carrier having portions spaced apart from each other in the direction of said axis and said pinions and said internal gear being disposed between said spaced-apart portions of said at least one carrier.

15. The apparatus of claim 14, wherein said spaced-apart portions of said at least one carrier form part of said sealing means.

16. The apparatus of claim 14, wherein said at least one carrier has a first part remote from and a second part nearer to said axis, said second part being confined in one of said first and second masses and said spaced-apart portions of said at least one carrier being closely adjacent that one of said first and second masses which confines said second part of said at least one carrier.

17. The apparatus of claim 13, wherein that one of said first and second masses which defines said recess includes a ring which surrounds said chamber, said sealing means including a substantially plate-like portion of said ring.

18. The apparatus of claim 17, wherein said sealing means further comprises a substantially plate-like wall extending substantially radially inwardly from said ring toward said axis beteen said chamber and the other of said first and second masses.

19. The apparatus of claim 3, wherein one of said first and second masses has a side confronting the other of said first and second masses, and further comprising means for locating said other of said first and second masses against axial movement relative to said one of said first and second masses.

20. The apparatus of claim 19, wherein said locating means is borne by said one of said first and second masses.

21. The apparatus of claim 19, wherein said locating means comprises at least one friction ring.

22. The apparatus of claim 21, wherein said friction ring is located at a predetermined radial distance from said axis.

23. The apparatus of claim 3, wherein said planetary has a first portion more distant from and a second portion nearer to said axis and provided with at least one projection, and further comprising a friction generating device provided on one of said first and second masses and having at least one socket receiving said at least one projection with a predetermined play in a circumferential direction of said components.

24. The apparatus of claim 23, wherein said second portion of said planetary includes said at least one carrier.

25. The apparatus of claim 3, further comprising a friction generating device disposed between one of said first and second masses and a portion of said planetary, as seen in the direction of said axis, and including a diaphragm spring and a friction disc engaged by said spring.

26. The apparatus of claim 25, wherein said portion of said planetary includes said sun gear.

27. The apparatus of claim 3, wherein one of said first and second masses has a chamber which is at least partially filled with a viscous material and at least a portion of said energy storing means is disposed in said chamber, said one of said first and second masses having at least one abutment and said energy storing means reacting against said at least one abutment and bearing against said at least one carrier.

28. The apparatus of claim 27, wherein one of said first and second masses has a recess which is adjacent said chamber and receives at least a portion of said planetary, said recess being adjacent the other of said first and second masses.

29. The apparatus of claim 27, wherein said chamber extends in the direction of said axis and in a circumferential direction of said components, at least a portion of said planetary being disposed in said chamber.

30. The apparatus of claim 29, wherein said portion of said plantary includes said internal gear and said at least one pinion.

31. The apparatus of claim 27, wherein one of said first and second masses has a wall extending substantially radially of said axis and cooperating with a portion of said planetary to at least substantially seal said chamber.

32. The apparatus of claim 31, wherein said portion of said planetary includes said at least one pinion.

33. The apparatus of claim 27, wherein said at least one carrier is mounted on that one of said first and second masses which is provided with said chamber and further comprising a bearing for the other of said first and second masses, said bearing being provided on said at least one carrier.

34. The apparatus of claim 3, wherein said at least one carrier rotatably mounts one of said first and second masses.

35. The apparatus of claim 3, further comprising a bearing interposed between at least two of said first, second and intermediate masses to maintain said at least two masses in predetermined positions relative to each other as seen radially of said axis.

36. The apparatus of claim 35, wherein said at least one planet carrier forms part of said intermediate mass and one of said first and second masses has a hub coaxial with the other of said first and second masses, said bearing being disposed between said at least one carrier and said hub.

37. The apparatus of claim 35, wherein said bearing is disposed between a hub carried by said first mass and a support provided on said second mass.

38. The apparatus of claim 35, wherein said bearing includes at least one annulus of rolling elements, a first race surrounding a hub of one of said at least two masses and a second race surrounded by the other of said at least two masses.

39. The apparatus of claim 38, wherein said at least two masses have means for holding said bearing against movement in the direction of said axis relative to said hub and said other of said at least two masses.

40. The apparatus of claim 38, further comprising a thermal insulator between one of said races and the respective one of said at least two masses.

41. The apparatus of claim 40, wherein said insulator has a substantially L-shaped cross-sectional outline.

42. The apparatus of claim 35, wherein said bearing is a friction bearing.

43. The apparatus of claim 42, wherein said first mass has a hub and said second mass has a support extending substantially radially of said axis, said friction bearing being provided between said hub and said support.

44. The apparatus of claim 35, wherein said first mass has a hub including a larger-diameter portion more distant from and a smaller-diameter portion nearer to said second mass, as seen in the direction of said axis, said bearing being provided between said smaller-diameter portion and a radially inner portion of said second mass.

45. The apparatus of claim 44, wherein said bearing is narrow as seen radially of said axis.

46. The apparatus of claim 44, wherein said smaller-diameter portion of said hub is closely adjacent said radially inner portion of said second mass, as seen radially of said axis.

47. The apparatus of claim 35, wherein said sun gear surrounds and is centered by said bearing.

48. The apparatus of claim 3, wherein said energy storing means comprises at least one coil spring.

49. The apparatus of claim 48, wherein said coil spring is an arcuate coil spring.

50. The apparatus of claim 48, wherein said at least one coil spring has a plurality of convolutions and an axial length which is a multiple of the diameters of said convolutions.

51. The apparatus of claim 3, wherein said energy storing means comprises a plurality of coil springs having helical convolutions, each of said convolutions having a diameter which is a relatively large fraction of an axial length of the respective spring.

52. The apparatus of claim 3, wherein said energy storing means comprises coil springs disposed end-to-end, operating in series, and extending in a circumferential direction of said components.

53. The apparatus of claim 3, wherein said planetary is disposed at a first radial distance and said energy storing means is disposed at a greater second radial distance from said axis.

54. The apparatus of claim 3, wherein said energy storing means tends to move radially of and away from said axis under the action of centrifugal force in response to rotation of said components, and further comprising at least one wear-resistant member provided in at least one of said components in the path of radially outward movement of said energy storing means.

55. The apparatus of claim 3, wherein said planetary has a plurality of stages.

56. The apparatus of claim 55, wherein said at least one pinion has a first portion meshing with said internal gear and a different second portion coaxial with said first portion and meshing with said sun gear.

57. The apparatus of claim 3, wherein said first component is arranged to receive torque from a prime mover designed to transmit a predetermined maximum torque, said torque limiting means being operative to permit the transmission of a torque which at least matches said maximum torque.

58. The apparatus of claim 3, wherein said at least one carrier forms part of said torque limiting means.

59. The apparatus of claim 3, wherein said at least one carrier is connected with said torque limiting means.

60. The apparatus of claim 59, wherein said torque limiting means is rotatable with said at least one carrier.

61. The apparatus of claim 3, wherein said torque limiting means is in frictional engagement with one of said first and second masses.

62. The apparatus of claim 61, wherein said torque limiting means is in frictional engagement with said first mass.

63. The apparatus of claim 3, wherein one of said first and second masses has a chamber for at least a portion of said energy storing means, one of said first and second masses carrying a wall bounding a portion of said chamber and said torque limiting means cooperating with said wall.

64. The apparatus of claim 63, wherein said wall is of one piece with the mass which carries said wall.

65. The apparatus of claim 63, wherein said wall is of one piece with said first mass.

66. The apparatus of claim 3, wherein said torque limiting means has at least one friction lining.

67. The apparatus of claim 3, wherein said torque limiting means comprises at least one resilient element which is stressed in the direction of said axis.

68. The apparatus of claim 67, wherein said at least one resilient element comprises a diaphragm spring.

69. The apparatus of claim 67, wherein one of said first and second masses defines a chamber for a supply of a viscous material and includes a wall bounding a portion of said chamber, said resilient element bearing upon said wall.

70. The apparatus of claim 3, wherein said torque limiting means comprises at least one first friction generating device and further comprising at least one additional friction generating device operating between two of said masses.

71. The apparatus of claim 3, further comprising a friction generating device, said torque limiting means being disposed at a first radial distance from said axis and said friction generating device being disposed at a lesser second radial distance from said axis.

72. The apparatus of claim 3, further comprising a friction generating device arranged to operate between said components to oppose rotation of said components relative to each other at least after said components complete a predetermined angular movement relative to each other.

73. The apparatus of claim 3, further comprising a friction generating device arranged to oppose rotation of said components relative to each other, and a form-locking connection between said friction generating device and one of said first and second masses.

74. The apparatus of claim 73, wherein said form-locking connection is provided between said friction generating device and said second mass.

75. The apparatus of claim 73, wherein said form-locking connection is operative to establish a predetermined extent of movability between said friction generating device and said one of said first and second masses.

76. The apparatus of claim 3, further comprising means for shielding said planetary against overstressing.

77. The apparatus of claim 76, wherein said shielding means comprises at least one stop operating in parallel with said planetary.

78. The apparatus of claim 76, wherein said shielding means contains a resilient material.

* * * * *